United States Patent
Annamalai et al.

(10) Patent No.: US 9,794,747 B2
(45) Date of Patent: Oct. 17, 2017

(54) LOCATION CONTINUITY SERVICE FOR LOCATING MOBILE DEVICES USING MULTIPLE ACCESS NETWORKS INCLUDING WIRELESS TELECOMMUNICATION NETWORKS

(71) Applicant: T-Mobile USA, Inc., Bellevue, WA (US)

(72) Inventors: Magesh Annamalai, Renton, WA (US); Gamze Seckin, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 3 days.

(21) Appl. No.: 14/810,217

(22) Filed: Jul. 27, 2015

(65) Prior Publication Data

US 2015/0334528 A1 Nov. 19, 2015

Related U.S. Application Data

(60) Division of application No. 13/309,267, filed on Dec. 1, 2011, now Pat. No. 9,094,927, and a
(Continued)

(51) Int. Cl.
*H04W 4/02* (2009.01)
*H04W 4/22* (2009.01)
(Continued)

(52) U.S. Cl.
CPC ............ *H04W 4/023* (2013.01); *H04W 4/22* (2013.01); *H04W 64/00* (2013.01); *H04W 60/005* (2013.01); *H04W 88/06* (2013.01)

(58) Field of Classification Search
None
See application file for complete search history.

(56) References Cited

U.S. PATENT DOCUMENTS

| 5,724,660 A | 3/1998 | Kauser et al. |
| 6,002,679 A | 12/1999 | Liu et al. |

(Continued)

FOREIGN PATENT DOCUMENTS

| EP | 1583374 A1 | 10/2005 |
| EP | 2051556 A1 | 4/2009 |

(Continued)

OTHER PUBLICATIONS

Annannalai, Magesh, "Method and Delivery of UMA Value Added Location Services via SUPL", U.S. Appl. No. 60/853,086, filed Oct. 20, 2006, 15 pages.
(Continued)

*Primary Examiner* — Olumide T Ajibade Akonai
*Assistant Examiner* — Margaret G Mastrodonato
(74) *Attorney, Agent, or Firm* — Lee & Hayes, PLLC

(57) ABSTRACT

A location continuity application server described herein is configured to access from an access network a set of location data associated with a position measurement for a mobile device. The location continuity application server may also access from another access network another set of location data associated with another position measurement for the mobile device and combine the sets of location data to determine a location of the mobile device. Further, prior to accessing the set of location data, the location continuity application server may provide reference location data associated with a reference location of the mobile device to the access network to enable the access network to obtain the position measurement based at least on the reference location data. The location continuity application server may also access the set of location data and determine the location of the mobile device responsive to a request from an emergency service provider.

18 Claims, 7 Drawing Sheets

Related U.S. Application Data continuation-in-part of application No. 12/769,524, filed on Apr. 28, 2010, now Pat. No. 8,472,974.

(60) Provisional application No. 61/419,749, filed on Dec. 3, 2010.

(51) Int. Cl.
*H04W 64/00* (2009.01)
*H04W 60/00* (2009.01)
*H04W 88/06* (2009.01)

(56) References Cited

U.S. PATENT DOCUMENTS

| | | |
|---|---|---|
| 6,104,712 A | 8/2000 | Robert et al. |
| 6,119,012 A | 9/2000 | Amirijoo |
| 6,222,483 B1 | 4/2001 | Twitchell et al. |
| 6,249,252 B1 | 6/2001 | Dupray |
| 6,252,545 B1 | 6/2001 | Da et al. |
| 6,463,288 B1 | 10/2002 | Havinis et al. |
| 6,603,976 B1 | 8/2003 | Amirijoo et al. |
| 6,603,978 B1 | 8/2003 | Carlsson et al. |
| 6,665,611 B1 | 12/2003 | Oran et al. |
| 6,671,514 B1 | 12/2003 | Cedervall et al. |
| 6,690,659 B1 | 2/2004 | Ahmed et al. |
| 6,711,417 B1 | 3/2004 | Gorman et al. |
| 6,801,778 B2 | 10/2004 | Koorapaty et al. |
| 6,952,181 B2 | 10/2005 | Karr et al. |
| 7,151,941 B2 | 12/2006 | Vanttinen et al. |
| 7,177,399 B2 | 2/2007 | Dawson et al. |
| 7,187,923 B2 | 3/2007 | Mousseau et al. |
| 7,194,354 B1 | 3/2007 | Oran et al. |
| 7,245,900 B1 | 7/2007 | Lamb et al. |
| 7,272,500 B1 | 9/2007 | Walker |
| 7,283,822 B2 | 10/2007 | Gallagher et al. |
| 7,304,985 B2 | 12/2007 | Sojka et al. |
| 7,313,143 B1 | 12/2007 | Bruno |
| 7,317,910 B2 | 1/2008 | Niemenmaa et al. |
| 7,336,668 B2 | 2/2008 | Adams |
| 7,336,962 B2 | 2/2008 | Levitan |
| 7,353,034 B2 | 4/2008 | Haney |
| 7,369,859 B2 | 5/2008 | Gallagher |
| 7,433,673 B1 | 10/2008 | Everson et al. |
| 7,436,789 B2 | 10/2008 | Caliskan et al. |
| 7,466,986 B2 | 12/2008 | Halcrow et al. |
| 7,577,431 B2 | 8/2009 | Jiang |
| 7,593,605 B2 | 9/2009 | King et al. |
| 7,606,555 B2 | 10/2009 | Walsh et al. |
| 7,610,011 B2 | 10/2009 | Albrett |
| 7,613,155 B2 | 11/2009 | Shim |
| 7,620,404 B2 | 11/2009 | Chesnais et al. |
| 7,640,008 B2 | 12/2009 | Gallagher et al. |
| 7,653,394 B2 | 1/2010 | McMillin |
| 7,664,494 B2 | 2/2010 | Jiang |
| 7,676,394 B2 | 3/2010 | Ramer et al. |
| 7,688,261 B2 | 3/2010 | DiEsposti |
| 7,714,778 B2 | 5/2010 | Dupray |
| 7,768,963 B2 | 8/2010 | Alizadeh-Shabdiz |
| 7,856,315 B2 | 12/2010 | Sheha et al. |
| 7,903,029 B2 | 3/2011 | Dupray |
| 7,904,096 B2 | 3/2011 | Shyr et al. |
| 7,949,326 B2 | 5/2011 | Gallagher et al. |
| 7,974,639 B2 | 7/2011 | Burroughs et al. |
| 8,041,335 B2 | 10/2011 | Khetawat et al. |
| 8,116,291 B2 | 2/2012 | Annamalai et al. |
| 8,145,183 B2 | 3/2012 | Barbeau et al. |
| 8,213,957 B2 | 7/2012 | Bull et al. |
| 8,320,931 B2 | 11/2012 | Ward et al. |
| 8,364,746 B2 | 1/2013 | Annamalai et al. |
| 8,369,266 B2 | 2/2013 | Jin et al. |
| 8,396,458 B2 | 3/2013 | Raleigh |
| 8,472,974 B2 | 6/2013 | Annamalai et al. |
| 8,509,731 B2 | 8/2013 | Kholaif et al. |
| 8,571,043 B2 | 10/2013 | Horner |
| 2002/0064141 A1 | 5/2002 | Sakakura |
| 2002/0077144 A1 | 6/2002 | Keller et al. |
| 2002/0123354 A1 | 9/2002 | Nowak |
| 2002/0151305 A1 | 10/2002 | Ward et al. |
| 2003/0009385 A1 | 1/2003 | Tucciarone et al. |
| 2003/0016648 A1 | 1/2003 | Lindsay et al. |
| 2003/0032404 A1 | 2/2003 | Wager et al. |
| 2003/0058844 A1 | 3/2003 | Sojka et al. |
| 2003/0095069 A1 | 5/2003 | Stilp |
| 2003/0096622 A1 | 5/2003 | Moilanen |
| 2003/0134648 A1 | 7/2003 | Reed et al. |
| 2003/0139182 A1 | 7/2003 | Bakkeby et al. |
| 2003/0148774 A1 | 8/2003 | Naghian et al. |
| 2003/0216143 A1 | 11/2003 | Roese et al. |
| 2003/0222819 A1 | 12/2003 | Karr et al. |
| 2004/0062264 A1 | 4/2004 | Adams |
| 2004/0076157 A1 | 4/2004 | Sojka et al. |
| 2004/0087315 A1 | 5/2004 | Dufva et al. |
| 2004/0102196 A1 | 5/2004 | Weckstrom et al. |
| 2004/0114577 A1 | 6/2004 | Sojka et al. |
| 2004/0122730 A1 | 6/2004 | Tucciarone et al. |
| 2004/0142704 A1 | 7/2004 | Scholz |
| 2004/0157590 A1 | 8/2004 | Lazaridis et al. |
| 2004/0162896 A1 | 8/2004 | Cen et al. |
| 2004/0166856 A1 | 8/2004 | Niemenmaa |
| 2004/0198386 A1 | 10/2004 | Dupray |
| 2004/0202120 A1 | 10/2004 | Hanson |
| 2004/0203853 A1 | 10/2004 | Sheynblat |
| 2004/0203915 A1 | 10/2004 | van Diggelen et al. |
| 2004/0224702 A1 | 11/2004 | Chaskar |
| 2004/0240430 A1 | 12/2004 | Lin et al. |
| 2004/0266457 A1 | 12/2004 | Dupray |
| 2005/0003831 A1 | 1/2005 | Anderson |
| 2005/0059415 A1 | 3/2005 | Easo et al. |
| 2005/0066044 A1 | 3/2005 | Chaskar et al. |
| 2005/0070306 A1 | 3/2005 | Kim et al. |
| 2005/0075116 A1 | 4/2005 | Laird et al. |
| 2005/0079821 A1 | 4/2005 | Bi |
| 2005/0130673 A1 | 6/2005 | Annamalai |
| 2005/0136943 A1 | 6/2005 | Banerjee et al. |
| 2005/0138144 A1 | 6/2005 | Sethi |
| 2005/0148342 A1 | 7/2005 | Sylvain |
| 2005/0153687 A1 | 7/2005 | Niemenmaa et al. |
| 2005/0159153 A1 | 7/2005 | Mousseau et al. |
| 2005/0170851 A1 | 8/2005 | Melpignano et al. |
| 2005/0181805 A1 | 8/2005 | Gallagher |
| 2005/0186948 A1 | 8/2005 | Gallagher et al. |
| 2005/0192024 A1 | 9/2005 | Sheynblat |
| 2005/0286466 A1 | 12/2005 | Tagg et al. |
| 2006/0009235 A1 | 1/2006 | Sheynblat et al. |
| 2006/0014517 A1 | 1/2006 | Barclay et al. |
| 2006/0014548 A1 | 1/2006 | Bolin et al. |
| 2006/0015513 A1 | 1/2006 | Poyhonen et al. |
| 2006/0025158 A1 | 2/2006 | Leblanc et al. |
| 2006/0029296 A1 | 2/2006 | King et al. |
| 2006/0052115 A1 | 3/2006 | Khushu |
| 2006/0062363 A1 | 3/2006 | Albrett |
| 2006/0098899 A1 | 5/2006 | King et al. |
| 2006/0172732 A1 | 8/2006 | Nylander et al. |
| 2006/0178146 A1 | 8/2006 | Lee et al. |
| 2006/0194594 A1 | 8/2006 | Ruutu et al. |
| 2006/0212217 A1 | 9/2006 | Sheha et al. |
| 2006/0245406 A1 | 11/2006 | Shim |
| 2006/0258365 A1 | 11/2006 | Cha et al. |
| 2006/0258369 A1 | 11/2006 | Burroughs et al. |
| 2006/0276201 A1 | 12/2006 | Dupray |
| 2006/0286984 A1 | 12/2006 | Bonner |
| 2006/0293066 A1 | 12/2006 | Edge et al. |
| 2007/0060097 A1 | 3/2007 | Edge et al. |
| 2007/0060114 A1 | 3/2007 | Ramer et al. |
| 2007/0061198 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061303 A1 | 3/2007 | Ramer et al. |
| 2007/0061317 A1 | 3/2007 | Ramer et al. |
| 2007/0072624 A1 | 3/2007 | Niemenmaa et al. |

(56) References Cited

U.S. PATENT DOCUMENTS

| | | |
|---|---|---|
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0087750 A1 | 4/2007 | Uchida |
| 2007/0123237 A1 | 5/2007 | Cacioppo et al. |
| 2007/0149213 A1 | 6/2007 | Lamba et al. |
| 2007/0155489 A1 | 7/2007 | Beckley et al. |
| 2007/0167174 A1 | 7/2007 | Halcrow et al. |
| 2007/0178913 A1 | 8/2007 | Niemenmaa et al. |
| 2007/0189497 A1 | 8/2007 | Bareis |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0217454 A1 | 9/2007 | Horner |
| 2007/0239724 A1 | 10/2007 | Ramer et al. |
| 2007/0288427 A1 | 12/2007 | Ramer et al. |
| 2008/0009268 A1 | 1/2008 | Ramer et al. |
| 2008/0014956 A1 | 1/2008 | Balasubramanian |
| 2008/0045236 A1 | 2/2008 | Nahon et al. |
| 2008/0076420 A1 | 3/2008 | Khetawat et al. |
| 2008/0076425 A1 | 3/2008 | Khetawat et al. |
| 2008/0076429 A1 | 3/2008 | Comstock et al. |
| 2008/0081620 A1 | 4/2008 | Lu et al. |
| 2008/0096594 A1 | 4/2008 | Vinding |
| 2008/0108319 A1 | 5/2008 | Gallagher |
| 2008/0146245 A1 | 6/2008 | Appaji |
| 2008/0166992 A1 | 7/2008 | Ricordi et al. |
| 2008/0192696 A1 | 8/2008 | Sachs et al. |
| 2008/0280624 A1 | 11/2008 | Wrappe |
| 2008/0305792 A1 | 12/2008 | Khetawat et al. |
| 2009/0054070 A1 | 2/2009 | Gallagher et al. |
| 2009/0171583 A1 | 7/2009 | DiEsposti |
| 2009/0177730 A1 | 7/2009 | Annamalai et al. |
| 2009/0185669 A1 | 7/2009 | Zitnik et al. |
| 2009/0270099 A1 | 10/2009 | Gallagher et al. |
| 2009/0275348 A1 | 11/2009 | Weinreich et al. |
| 2009/0311987 A1 | 12/2009 | Edge et al. |
| 2010/0046406 A1 | 2/2010 | Annamalai et al. |
| 2010/0069099 A1 | 3/2010 | Dunn et al. |
| 2010/0150120 A1 | 6/2010 | Schlicht et al. |
| 2010/0216488 A1 | 8/2010 | Markoulidakis |
| 2010/0289640 A1 | 11/2010 | Annamalai |
| 2010/0291947 A1 | 11/2010 | Annamalai |
| 2010/0331017 A1 | 12/2010 | Ariga |
| 2011/0039576 A1 | 2/2011 | Prakash et al. |
| 2011/0047033 A1 | 2/2011 | Mahaffey et al. |
| 2011/0051658 A1 | 3/2011 | Jin et al. |
| 2011/0051665 A1 | 3/2011 | Huang |
| 2011/0111726 A1 | 5/2011 | Kholaif et al. |
| 2011/0159886 A1 | 6/2011 | Kangas et al. |
| 2011/0200022 A1 | 8/2011 | Annamalai |
| 2012/0052884 A1 | 3/2012 | Bogatin |
| 2012/0096490 A1 | 4/2012 | Barnes, Jr. |
| 2012/0116677 A1 | 5/2012 | Higgison et al. |
| 2012/0140749 A1 | 6/2012 | Caldwell et al. |
| 2012/0320888 A1 | 12/2012 | Annamalai et al. |
| 2013/0150085 A1 | 6/2013 | Jin et al. |
| 2013/0260749 A1 | 10/2013 | Annamalai et al. |

FOREIGN PATENT DOCUMENTS

| | | | |
|---|---|---|---|
| EP | 2173131 A1 | 4/2010 | |
| JP | 10239416 A | 9/1998 | |
| KR | 1020040034571 A | 4/2004 | |
| KR | 20070088455 A | 8/2004 | |
| KR | 20050031338 A | 4/2005 | |
| KR | 20060025111 A | 3/2006 | |
| WO | WO0027143 A1 | 5/2000 | |
| WO | WO2005004528 A1 | 1/2005 | |
| WO | WO2005060292 A1 | 6/2005 | |
| WO | WO2007048028 A2 | 4/2007 | |
| WO | WO2007121331 A2 | 10/2007 | |
| WO | WO2008049131 A2 | 4/2008 | |
| WO | WO2008051929 A2 | 5/2008 | |
| WO | WO2011139841 A2 | 11/2011 | |

OTHER PUBLICATIONS

Dyoub, et al., "Dueling Architectures Control Plane vs. User Plane" HP invent, Sep. 2004, 2 pages.

"Enabler Release Definition for Secure UserPlane for Location (SUPL)", Candidate Version 1.0, Open Mobile Alliance, Jan. 2007, 17 pages.

EP Search Report mailed Jan. 15, 2013 for EP 07760606.9, 8 pages.

Extended European Search Report, EP Patent Application 06826444.9, mailed Sep. 12, 2012, 8 pgs.

"Google Search of Location of Mobile", retrieved Jan. 28, 2010 at http://www.google.com/search, 2 pages.

Gum, et al., "Infrastructure Wireless Choices for LBS" GPS World, Mar. 2006, 5 pages.

"IP Multimedia Subsystem", Wikipedia, retrieved Mar. 9, 2009 at http://en.wikipedia.org/wiki/IP_Multimedia_Subsystem, 13 pages.

Martin-Escalona, et al., "Delivery of Non-Standardized Assistance Data in E-OTDGNSS Hybrid Location Systems", Personal, Indoor and Mobile Radio Communications, 2002. The 13th IEEE International Symposium, Sep. 2002, 5 pages.

Office Action for U.S. Appl. No. 13/309,267, mailed on Jan. 22, 2014, Magesh Annamalai, "Location Continuity Service for Locating Mobile Devices Using Multiple Access Networks Including Wireless Telecommunication Networks", 10 pages.

Office Action for U.S. Appl. No. 12/769,524, mailed Aug. 27, 2013, 8 pgs.

PCT Search Report and Written Opinion mailed Oct. 22, 2007 for PCT Application No. PCT/US2007/82133, 9 pages.

PCT Search REport and Written Opinion mailed Dec. 22, 2010 for PCT Application No. PCT/US2010/03510, 10 pages.

PCT Search Report and Written Opinion mailed Dec. 28, 2010 for PCT Application No. PCT/US2010/035014, 11 pages.

PCT Search Report and Written Opinion mailed Dec. 4, 2007 for PCT Application No. PCT/US2006/41226, 13 pages.

PCT Search Report and Written Opinion mailed Dec. 7, 2011 for PCT Application No. PCT/US2011/034344, 13 pages.

PCT Search Report and Written Opinion mailed Mar. 11, 2008 for PCT Application No. PCT/US2007/82136, 11 pages.

PCT Search Report and Written Opinion mailed May 28, 2008 for PCT Application No. PCT/US2007/82156, 2 pages.

PCT Search Report and Written Opinion mailed Sep. 9, 2008 for PCT Application No. PCT/US2007/66579, 9 pages.

Raja, et al., "We Know" IEEE Communication Engineer, Jun./Jul. 2004, 6 pages.

Schulzrinne et al, "Emergency Services for Internet Telephony Systems", Oct. 2004, Network Working Group, Internet Draft, 20 pgs.

"Secure User Plane Location Architecture", Candidate Version 1.0, Open Mobile Alliance, Jan. 2007, 80 pages.

"Secure User Plane Location Requirements", Candidate Version 1.0, Open MObile Alliance, Jun. 2006, 26 pages.

Spinney, Jonathan, "Wireless Location Uses in the User Plane and Control Plane" The Location Based Services Community, Jun. 2005, 3 pages.

Steinfield, Charles, "The Development of Location Based Services in Mobile Commerce", E-life after the dot.com bust, 2004, 15 pages.

"The 3GPP Standard for Convergence-Diagram", UMA Universal Mobile Access, http://www.umatoday.com/img/diagrams/umaServices.jpg, First Accessed Oct. 17, 2007, 1 page.

"The 3GPP Standard for Convergence-Dual-Mode Handsets", UMA Universal Mobile Access, UMA Today, 2007, 2 pages.

"The 3GPP Standard for Convergence-Femtocells", UMA Universal Mobile Access, UMA Today, 2007, 2 pages.

"The 3GPP Standard for Convergence-SoftMobiles", UMA Universal Mobile Access, UMA Today, 2007, 2 pages.

"The 3GPP Standard for Convergence-Terminal Adaptors", UMA Universal Mobile Access, UMA Today, 2007, 2 pages.

(56) References Cited

OTHER PUBLICATIONS

"User Plane Location Requirements", Candidate Version 1.0, Open Mobile Alliance, Jan. 2007, 26 pages.
"Userplane Location Protocol", Candidate Version 1.0, Open Mobile Alliance, Jan. 22, 2007, 56 pgs.

| Session ID | Device ID | Determined Location: Process H1 | Determined Location: Process H2 | Location Data: Network 1 Method 1 | Location Data: Network 1 Method 2 | Location Data: Network 2 Method 2 | Location Data: Network 3 Method 3 | ... |
|---|---|---|---|---|---|---|---|---|
| A3F1 | LL13 | F1[L1[t]-Ln[t]] | F1'[L1[t]-Ln[t]] | L1[t] | L2[t] | L3[t] | L4[t] | ... |
| A3F1 | DJ82 | F2[L1[t]-Ln[t]] | F2[L1[t]-Ln[t]] | NULL | L5[t] | L6[t] | L7[t] | ... |
| G2K1 | A6N5 | F3[L1[t]-Ln[t]] | F3[L1[t]-Ln[t]] | L8[t] | NULL | L9[t] | NULL | ... |
| KLA1 | DMJ20 | F4[L1[t]-Ln[t]] | NULL | L10[t] | L11[t] | L12[t] | L13[t] | ... |
| ... | ... | ... | ... | ... | ... | ... | ... | ... |

*FIG. 5*

LOCATION CONTINUITY SERVICE FOR LOCATING MOBILE DEVICES USING MULTIPLE ACCESS NETWORKS INCLUDING WIRELESS TELECOMMUNICATION NETWORKS

CROSS REFERENCE TO RELATED PATENT APPLICATIONS

This divisional patent application claims priority to U.S. patent application Ser. No. 13/309,267, filed Dec. 1, 2011, which claims priority to U.S. Provisional Application No. 61/419,749, filed Dec. 3, 2010. U.S. patent application Ser. No. 13/309,267 is also a continuation-in-part of U.S. patent application Ser. No. 12/769,524, filed Apr. 28, 2010, entitled: LOCATION CONTINUITY SERVICE FOR LOCATING MOBILE DEVICES USING MULTIPLE ACCESS NETWORKS INCLUDING WIRELESS TELECOMMUNICATION NETWORKS (now U.S. Pat. No. 8,472,974 issued Jun. 25, 2013). Application Ser. Nos. 13/309,267, 61/419,749 and 12/769,524 are fully incorporated herein by reference.

BACKGROUND

The popularity of location-based services has substantially increased in recent years. For example, mobile device users now employ location-based services for navigation, to perform location-based searching, to receive location-based alerts or advertising, to search for or receive notification of nearby acquaintances, and/or the like. Likewise, other parties (e.g., network operators, third-party location-based service providers, remote telemetry users, advertisers, etc.) may employ location-based services to enable emergency services (e.g., E911 services), enable asset tracking or recovery services, provide location-based alerts or advertising, provide notification of nearby acquaintances, perform network registration or billing, and/or the like. The recent increase in the popularity of location-based services has led to the development of many different location determination techniques for mobile devices. Certain location determination techniques may be suitable only for certain kinds of mobile devices and/or certain kinds of radio access networks.

Many different types of radio access networks have been deployed to facilitate radio transmissions to and from mobile devices. As a result, at a single geographic location, a mobile device user may be able to connect to more than one type of radio access network. For example, standing on a street corner, a mobile device user may be able to connect simultaneously to a Global System for Mobile Communications ("GSM") network and a Worldwide Interoperability for Microwave Access ("WiMAX") network. In addition, at any single geographic location a mobile device user may be able to access a hard-wired access network, such as a cable network or a landline phone network. Thus, at a certain time point, a mobile device may be located by more than one location determination technique using one or more wired or wireless access networks. For example, at a particular time, a mobile device may be located by a technique suitable for GSM networks (e.g., Uplink Time Difference of Arrival ("U-TDOA") techniques) and a technique suitable for WiMAX networks (e.g., Assisted Global Positioning System ("AGPS") techniques).

As a mobile device user moves, the types of available access networks may also change. For example, during the first part of a session, which may include a voice, data, multimedia, location and/or messaging session, a mobile device may only be in range of a GSM network but after its user moves, the device may only be able to access a WiMAX network. Thus, during a single session (e.g., a single voice call) on a mobile device, the location determination techniques available to locate that mobile device may change.

BRIEF DESCRIPTION OF THE DRAWINGS

FIG. 5 shows a table that conceptually illustrates how a location continuity application server stores location data.

DETAILED DESCRIPTION

Figure 1:
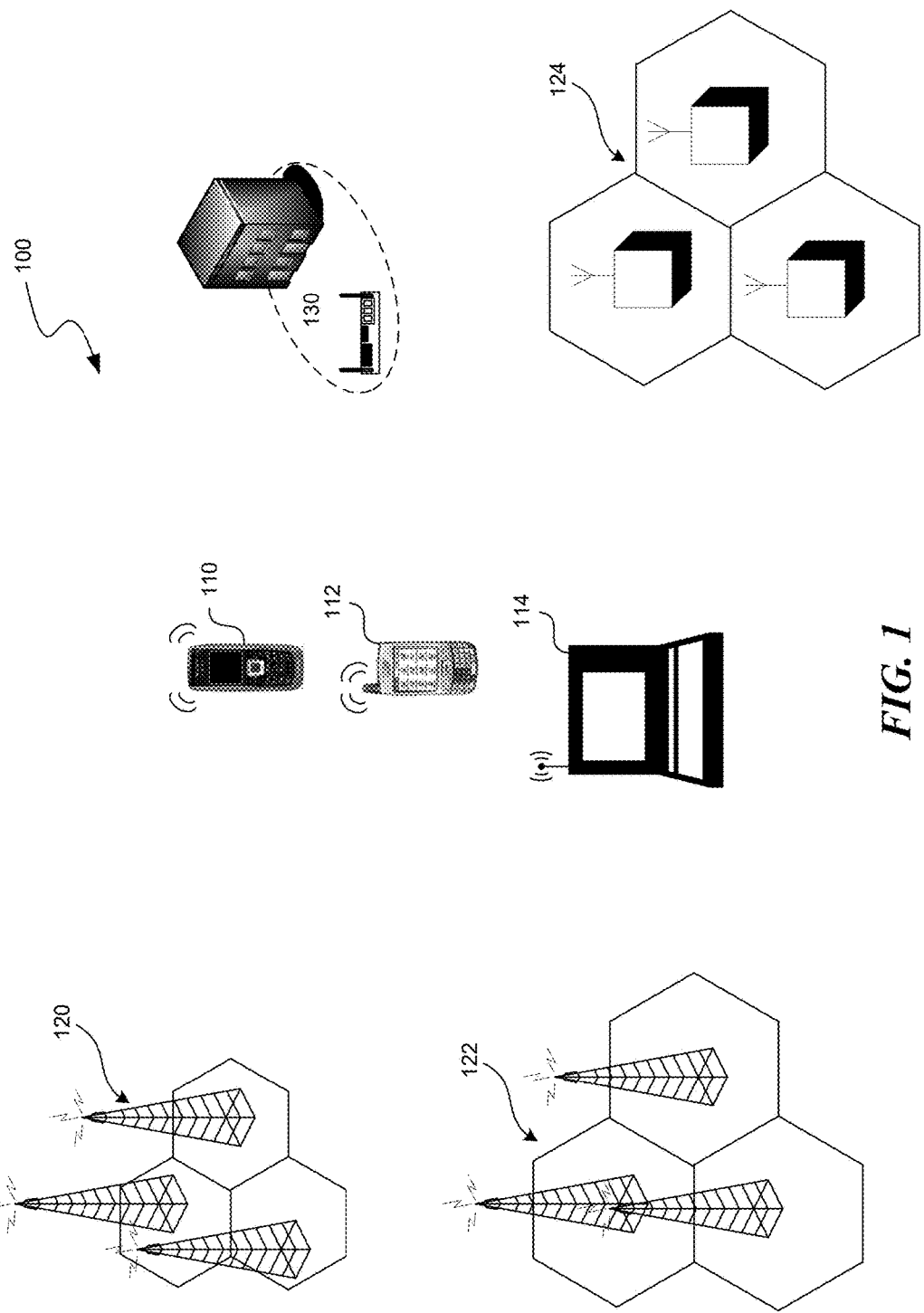
FIG. 1 is a diagram of a representative environment in which a location continuity service operates.

Described herein is a location continuity service having a location continuity application server ("LCAS") that utilizes location data generated by multiple access networks, to determine the location of a mobile device. Responsive to a service request for a location of a mobile device, the LCAS specifies a suitable reconciliation process that identifies two or more location estimation techniques that are implemented by different access networks and indicates how to utilize the location data produced by two or more identified estimation techniques. In accordance with the applied reconciliation process, the LCAS interacts with various access networks identified by the process in order to receive location data generated by the access networks, including positioning measurements and/or estimated locations. The LCAS analyzes the received location data to determine the location of a mobile device and provide the determined location to a location-based service. For example, a reconciliation process may identify two or more location estimation techniques that should be implemented and may indicate how the results of these two estimation techniques should be combined to estimate the location of a mobile device. As another example, a reconciliation process may identify a location (such as a reference location) generated by a first access network that should be utilized as a reference location by a second access network when it estimates the location of a mobile device.

Typical location estimation or determination techniques implemented by radio access networks include Time Difference on Arrival ("TDOA") (including Uplink-TDOA (U-TDOA), Observed TDOA ("OTDOA"), Ideal Period Downlink-OTDOA ("IPDL-OTDOA"), and other TDOA procedures), Cell Identification ("CI"), CI plus Timing Advance ("CI-TA"), use of a Global Positioning System ("GPS"), use of an Assisted Global Positioning System ("AGPS"), Assisted Global Navigation Satellite System ("AGNSS"), Round Trip Time ("RTT") measurements, CI plus RTT ("CI-RTT"), Enhanced Observed Time Difference ("E-OTD"), WiFI Data Base location, triangulation, and/or the like. Some of these location estimation techniques determine or estimate the location of a mobile device using available information, such as an identifier of a cell, femtocell, picocell, access point, base station, Node-B, eNode-B, cell site, and/or other network component or network that is accessible to the mobile device. Suitable identifiers include an Internet Protocol ("IP") address, a Cell Global Identity ("CGI"), an Enhanced CGI ("E-CGI"), a Media Access Control ("MAC") address, a Service Set Identifier ("SSID"), an International Mobile Subscriber Identity ("IMSI"), an International Mobile Equipment Identity ("IMEI"), a serial number, and/or the like. Suitable examples of determining or estimating the location of a mobile device according to an identifier or other technique are described in International Patent Application PCT/US2007/066579, entitled "Mobile Computing Device Geographical Location Determination," which was filed on Apr. 12, 2007 (WO2007/121331 published Oct. 25, 2007); International Patent Application PCT/US2006/041226, entitled "System and Method for Determining Device Location in an IP-Based Wireless Telecommunications System," which was filed on Oct. 20, 2006 (WO2007/048028 published Apr. 26, 2007); International Patent Application PCT/US2007/082136, entitled "System and Method for Utilizing IP-Based Wireless Telecommunications Client Location Data," which was filed on Oct. 22, 2007 (WO2008/051929 published May 2, 2008); and International Patent Application PCT/US2007/082133, entitled "Two Stage Mobile Device Geographical Location Determination," which was filed on Oct. 22, 2007 (WO2008/049131 published Apr. 24, 2008); all of which are hereby incorporated by reference in their entirety.

A location continuity service having an LCAS may be employed to facilitate the provisioning of location-based services to mobile device users, emergency services users, network operators, remote telemetry users, and others. The use of an LCAS enables service providers to provide better position continuity and location continuity as a mobile device utilizes various access networks to improve the overall end-user experience and to provide a rich communication service to an end-user. An LCAS may also permit service providers to locate a mobile device more accurately and/or more quickly while utilizing fewer system resources and/or incurring lower costs.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.
Illustrative Environments FIG. 1 illustrates a representative environment 100 in which the location continuity service may operate. Environment 100 includes mobile devices 110, 112, and 114 and wireless or wired networks 120, 122, 124, and 130. Mobile devices 110, 112, and 114 are configured to communicate with, or through, one or more of networks 120, 122, 124, and 130. Although mobile devices by their nature will typically connect via a wireless network, under certain circumstances mobile devices may connect via a wired network.

Mobile devices 110, 112, and 114 may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants (PDAs), radio frequency devices, infrared devices, handheld computers, laptop computers, wearable computers, tablet computers, pagers, integrated devices combining one or more of the preceding devices, and/or the like. As such, mobile devices 110, 112, and 114 may range widely in terms of capabilities and features. For example, a mobile telephone may have a numeric keypad, the capability to display only a few lines of text and be configured to interoperate with only GSM networks. However, other mobile devices (e.g., smart phones) may have a touch-sensitive screen, a stylus, an embedded GPS receiver, and a relatively high-resolution display and be configured to interoperate with multiple types of networks. Mobile devices 110, 112, and 114 may also include SIM-less devices (i.e., mobile devices that do not contain a functional subscriber identity module ("SIM")), roaming mobile devices (i.e., mobile devices operating outside of their home access networks), and/or mobile software applications.

Users may employ mobile devices 110, 112, and 114 to communicate with other users or devices. In addition, users may employ mobile devices 110, 112, and 114 to receive, provide, or otherwise interact with location-based services such as emergency services (e.g., E911), asset tracking or recovery services, location-based alerts or advertising services, social networking services such as identification of nearby friends and family, and/or the like. Additionally, network operators may utilize location-based services to perform network registration of a mobile device 110, 112, 114 or billing/charging for mobile device services. Location-based services may be initiated via network components or via the mobile device.

Mobile devices 110, 112, and 114 typically include a processing unit, volatile memory and/or nonvolatile memory, a power supply, one or more network interfaces, an audio interface, a display, a keypad or keyboard, a GPS receiver and/or other location determination component, and other input and/or output interfaces. The various components of mobile devices 110, 112, and 114 may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. In addition, the memories may be employed to store operational data, content, contexts, and/or the like. The memories may also store one or more applications configured to receive and/or provide messages to and/or from another device or component. These messages may also be displayed and/or stored on mobile device 110, 112, or 114. Such messages may include short message service (SMS) messages, multi-media message service (MMS) messages, instant messaging (IM) messages, enhanced message service (EMS) messages, rich communication service content, and/or any other content directed toward a user of mobile devices 110, 112, or 114. The memories of mobile devices 110, 112, and 114 may also store one or more applications configured to receive and/or provide information to location-based services, or to facilitate performance of location estimation or determination techniques. The memories may also store applications for performing location estimation or determination techniques.

Networks 120, 122, 124, and 130 may include virtually any radio access networks or hard-wired access networks (collectively, "access networks") for facilitating communications to or from mobile devices 110, 112, and 114 using any wireless protocol or standard. These protocols or standards include GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), VoIP, SUPL, IP Multimedia Subsystem ("IMS"), and/or the like. Additionally, networks 120, 122, 124, and 130 may include hard-wired networks for facilitating communications to or from mobile devices 110, 112, and 114 using any protocol or standard, such as cable networks, wired telephone networks (e.g., a PSTN), or other wired IP networks. Networks 120, 122, 124, and 130 may be operated by a mobile telephony service provider, a cable operator, an Internet service provider, online service providers, a wired telephone network operator or service provider, businesses, individuals, or other network operators.

In FIG. 1, networks 120, 122, and 124 are illustrated as macronetworks, e.g., networks typically designed to cover relatively large areas such as cities, metropolitan areas, regional areas, multistate areas, and/or the like. Protocols and standards such as GSM, TDMA, UMTS, EVDO, LTE, CDMA, OFDM, GPRS, EDGE, AMPS, WiMAX, UMB, and/or the like are generally employed with macronetworks. Further, network 130 is illustrated as a micronetwork, e.g., a network typically designed to cover a smaller area such as a neighborhood, park, city, building, home, and/or the like. To provide an example, protocols and standards such as WiFi, GAN, UMA, Wireless Universal Serial Bus (WUSB), ZigBee, and/or the like are generally employed with micronetworks. However, in certain circumstances (e.g., in conjunction with picocell broadcast architecture or the like), micronetworks may also employ protocols or standards more traditionally associated with macronetworks. For example, in some implementations, LTE or 3G protocols may be used in a micronetwork that provides typical LTE/3G functionalities but over a smaller physical range than typical LTE/3G networks. Such networks or their components may be known as a nano-e-node Bs or home e-node Bs ("HeNB").

At any given location, one or more of networks 120, 122, 124, and 130 may provide overlapping coverage areas. For example, at a particular geographical location, a mobile device 110, 112, 114 may be within range of a UMA network, a GSM network, a UMTS network, an EVDO network and may be physically connected to a hard-wired IP-based cable network. At another geographical location, the mobile device may be within range of the same set or a different set of networks.

At times, a user of a mobile device 110, 112, 114 or a party providing services to a mobile device may want to determine the location of the mobile device. To improve the performance of a location determination, it may be advantageous to utilize more than one overlapping network to determine the location of the mobile device. Additionally, if a device moves from a first geographic location covered by a first set of networks to a second geographic location covered by a second set of networks, it may be advantageous to utilize the historical data (e.g., estimated locations or reference locations) generated by the first set of networks to inform the location determinations made by the second set of networks. Described herein is a location continuity application server ("LCAS") that utilizes positioning measurements and/or estimated locations that are generated by multiple networks. The LCAS applies a reconciliation process that identifies two or more location estimation techniques that are implemented by different access networks and indicates how to utilize the two or more identified estimation techniques. In accordance with the reconciliation process, the LCAS interacts with various access networks identified by the process in order to receive location data or information from the access networks, including positioning measurements (i.e., data that can be used to estimate a device location) and/or estimated locations (i.e., estimates of a device location or reference locations). The LCAS also analyzes the received location data to determine the location of a mobile device and provide the determined location to a location-based service.

To improve the performance of a location-based service, it is desirable to maintain position continuity and location continuity across a session. One intuitive example of a session is a telephone voice call made using a particular mobile device. In such an example, position continuity refers to taking continuous positioning measurements of the mobile device within a network (e.g., continuously making RTT measurements or range measurements) during the session, even as the mobile device utilizes different types of access networks at different points during the call. In the example, location continuity refers to continuously determining or estimating the geographic location of the mobile device (e.g., latitude, longitude and/or altitude) using the positioning measurements (e.g., using RTT analysis techniques) and providing determined locations to a location-based service even as the mobile device utilizes different access networks or moves away from one of the home access networks. Other examples of sessions include data, multimedia, location and/or messaging sessions.

In other scenarios, a session may span multiple access networks, mobile devices, IMSs, network cores, applications running on mobile devices or elsewhere, application sessions, charging schemes (i.e., billing schemes), or other session factors. Generally speaking, position continuity refers to the ability to continuously take positioning measurements of one or more mobile devices 110, 112, and 114 using network hardware such as one or more SMLC, SAS, E-SMLC, SPC, LIS, and/or IP SMLC (all described herein with respect to location estimation component 350) even as one or more session factors change during a session (e.g., as the access network, application, or mobile device that is used changes). Location continuity generally refers to preserving the ability to deliver an initial location estimate and subsequent updated location estimates to a public safety answering point ("PSAP") or another location-based service, following a handover from one access network to another (and/or following a change in another session factor), in a manner that is transparent to the PSAP or location-based service. The definitions of a session and session continuity are developed in greater detail in technical specifications and reports developed by the 3rd Generation Partnership Project ("3GPP"™), including TR 23.893 v8.0.0, which is incorporated herein by reference in its entirety.

Figure 2:
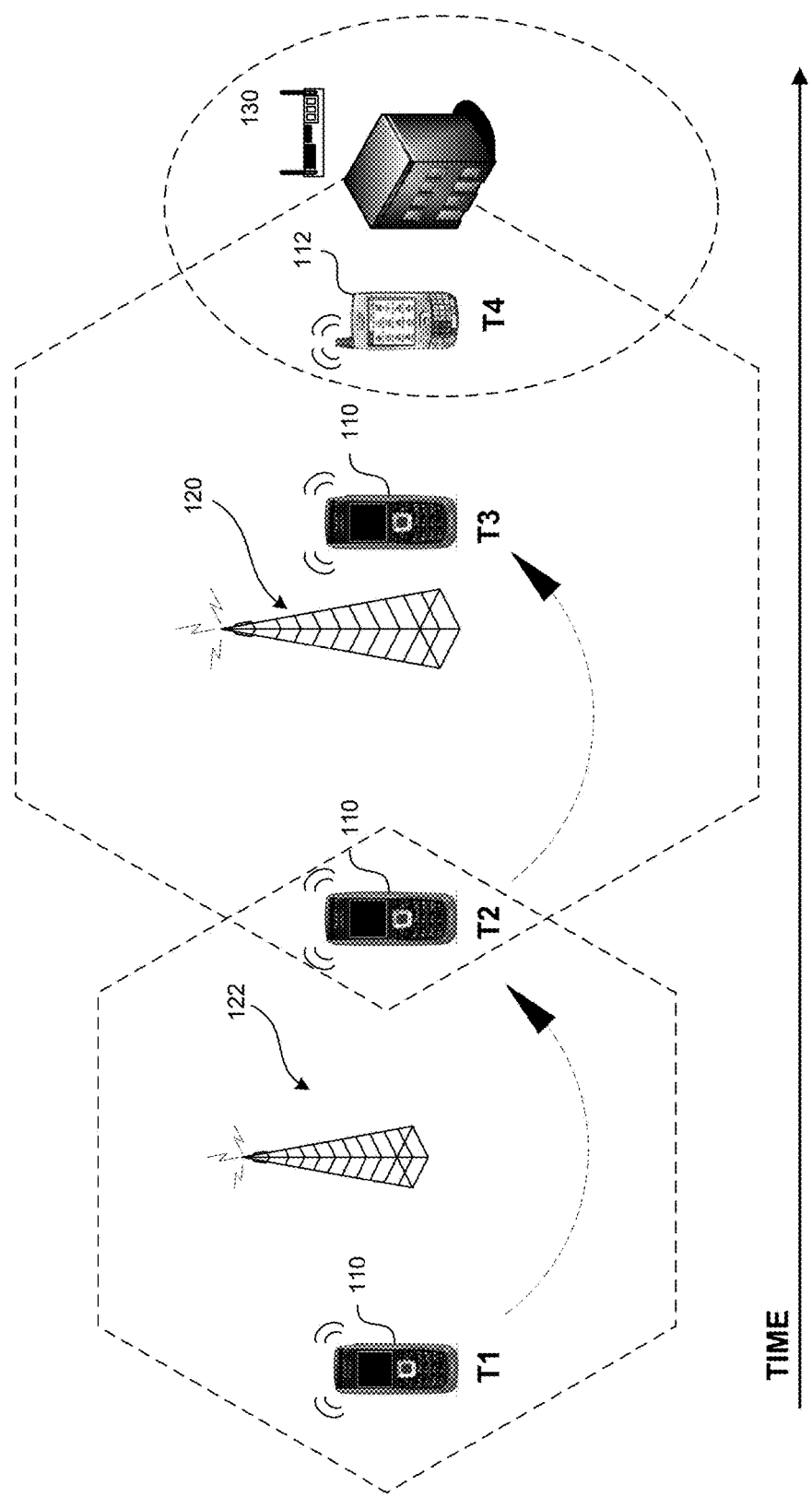
FIG. 2 is a diagram illustrating an example use case where position continuity and location continuity are maintained across networks and mobile devices by the location continuity service during a session.

FIG. 2 is a diagram illustrating an example use case where position continuity and location continuity are desirable across a session involving an emergency call (e.g., a 911 call). In the depicted example, at time T1 a mobile device 110 utilized by a user is in range of a GSM access network 122. At time T1 the user requests and receives an estimate of his location using a navigation program installed on the mobile device. At time T2, as a result of motion by the user, the mobile device 110 is in range of both the GSM access network 122 and a UMTS access network 120. At time T2, the user utilizes the mobile device to initiate an emergency call (e.g., a 911 call to report a serious car accident). At time T3, the mobile device 110 has moved out of range of the GSM access network 122 (e.g., because the user drives out of the range of the GSM access network, or because the GSM access network otherwise becomes unavailable). Prior to time T4, the user of mobile device 110 adds a second mobile device 112 to the same emergency call (e.g., using three-way calling or transfer features). The mobile device 110 may also hang up on the emergency call. At time T4, the second mobile device 112 remains in range of the UMTS access network 120 but is also in range of a GAN access network 130.

In the example depicted in FIG. 2, it is desirable to rapidly and accurately determine the location of the mobile device 110 at the initiation of the call so that the emergency call may be suitably routed to an appropriate PSAP or similar entity. To do so, the disclosed location continuity service utilizes positioning measurements and location estimates from two or more of the multiple telecommunication networks that are accessible to the mobile device. That is, at time T1, the location continuity service may provide the positioning measurements and/or location estimates generated by the GSM access network 122 to network components to perform the emergency call routing. At time T2, the location continuity service may also take simultaneous positioning measurements and/or location estimates from the UMTS access network 120 since the UMTS access network is also accessible to the mobile device. The positioning measurements and/or location estimates (including reference locations) from the two networks may be used alone or in combination to ensure the highest location accuracy. Similarly, the location continuity service quickly fixes and provides the determined location of the second mobile device 112 when the second mobile device is added to the emergency call. To do so, the location continuity service may utilize the positioning measurements and/or location estimates already generated for the mobile device 110 from the UMTS network at time T3 to estimate the location of the second mobile device. The location continuity service may also supplement or supplant the positioning measurements and/or location estimates from the mobile device 110 with positioning measurements and/or location estimates for the second mobile device 112 from the UMTS access network 120 or GAN access network 130. By doing so, the location continuity service provides the best location information regarding the session to the PSAP.

Illustrative Communications System

Figure 3:
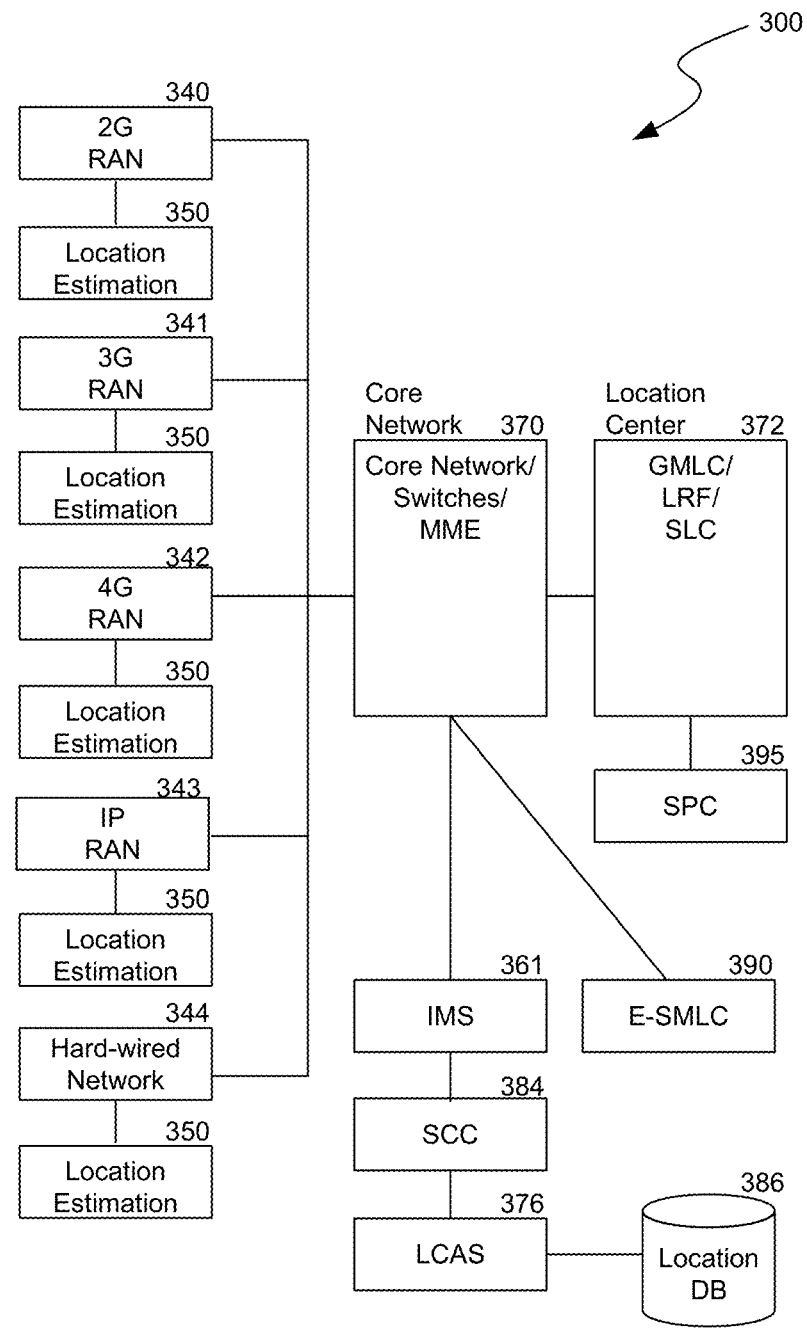
FIG. 3 is a block diagram of a suitable communications system in which the location continuity service operates.

FIG. 3 illustrates a communications system 300 in which the location continuity service may be utilized to provide position and location continuity across access networks. Communications system 300 depicts five access networks 340-344 that are coupled to supporting network infrastructure via one or more core networks 370. While five access networks are depicted in FIG. 3, it will be appreciated that a greater or lesser number of access networks may exist within the communications system 300. The communications system 300 depicted in FIG. 3 is operated by one or more telecommunications service providers, and may be coupled (not shown) with other communications systems operated by the same or other telecommunications service providers.

A second-generation radio access network ("2G RAN") 340 may include any combination of radio access networks that utilize second-generation ("2G") and 2G transitional mobile telephony protocols to communicate with mobile devices, such as radio access networks that use protocols such as GSM, IS-95, GPRS, IS-2000, and/or EDGE. The 2G RAN 340 may take positioning measurements and/or provide location estimates by utilizing techniques that are compatible with the applicable second-generation protocols. For example, the 2G RAN 340 may comprise a GSM access network configured to provide positioning measurements and/or location estimates using U-TDOA, CI-TA, E-CGI, GPS, AGPS, and/or E-OTD techniques and/or hybrid methods that employ combinations of these techniques.

A third-generation radio access network ("3G RAN") 341 may include any combination of radio access networks that utilize third-generation ("3G") and 3G transitional mobile telephony protocols to communicate with mobile devices, such as radio access networks that use protocols such as UMTS, IS-856, HSDPA, HSUPA, EVDO, and/or IEEE 802.16e-2005. For example, 3G RAN 341 may comprise a UMTS access network configured to provide positioning measurements and/or location estimates using CI, CI-RTT, GPS, AGPS, and/or OTDOA techniques and/or hybrid methods that employ combinations of these techniques.

A fourth-generation radio access network ("4G RAN") 342 may include any combination of radio access networks that utilize fourth-generation ("4G") and 4G transitional mobile telephony protocols, such as radio access networks that communicate with mobile devices using protocols such as LTE, Advanced LTE or LTE+ and WiMAX. As an example, 4G RAN 342 may comprise a WiMAX access network that provides positioning measurements and/or location estimates using A-GPS, U-TDOA, Cell ID, and/or hybrid methods that employ combinations of these techniques. As another example, 4G RAN 342 may comprise an LTE access network that provides positioning measurements and/or location estimates using AGPS, downlink positioning, CI and enhanced CI techniques, OTDOA, TDOA, AGNSS and/or hybrid methods that employ combinations of these techniques.

An IP radio access network ("IP RAN") 343, provides voice and/or data access to mobile devices and may comprise one or more access points and/or Unlicensed Network Controllers ("UNCs") that route communications between mobile devices and other network components over an IP-based network. An access point typically provides coverage for a relatively small area, such as for a femtocell within a building (e.g., home, office, shopping mall, train station, or the like) or within an aircraft, ship, train, or other vehicle. An access point may take the form of a WiFi access point, a HotSpot component, a wireless router, a wireless access point, and/or the like. As one example, IP RAN 343 may comprise a GAN that provides location estimates using identifiers such as MAC addresses, IMSI, IP addresses, and/or CGI and/or hybrid methods that employ combinations of these identifiers.

A hard-wired access network 344 provides IP-based network access to mobile devices via a wired physical communication link between the mobile device and the hard-wired access network 344. For example, a hard-wired access network 344 may comprise a cable network, a public switched telephone network (PSTN), and/or similar. As one example, a hard-wired access network 344 may provide positioning measurements and/or location estimates for a mobile device using the HTTP Enabled Location Delivery ("HELD") standards generated by the Internet Engineering Task Force ("IETF"), details of which may be found at tools.ietf.org. Other wireless IP-based networks (e.g., IP RAN 343) may similarly provide positioning measurements and/or location estimates using HELD standards. As another example, a hard-wired access network 344 may also provide positioning measurements and/or location estimates for a mobile device using a customer provided location address, an IP location, and a Layer 2 address of the end device.

Each of the various access networks 340-344 may be connected to a location estimation component 350 that provides and/or coordinates positioning measurements and/or location estimations within the corresponding access networks 340-344. Location estimation components 350 may comprise one or more discrete location estimation systems including, inter alia, a Serving Mobile Location Center ("SMLC"), a Standalone Assisted GPS SMLC ("SAS"), a Location Information Server ("LIS") (e.g., as described by the HELD standards discussed previously), and/or an IP SMLC. For simplicity, in FIG. 3, all the various discrete location estimation systems are shown within a single, amalgamated location estimation component 350, since each discrete system provides similar or analogous functionality. However, one having skill in the art will appreciate that a given access network may only be directly connected to a subset of the discrete systems represented by the amalgamated location estimation component 350. For example, a 2G RAN 340 may only be directly connected to an SMLC within the location estimation component 350 and not to an SAS. Moreover, certain location estimation systems may be connected to and provide location services across multiple networks 340-344. The communications system 300 may comprise other components that also provide and/or coordinate positioning measurements and/or location estimations within access networks, but these additional components may not be directly connected to the various access networks. For example, the communication system 300 may comprise an Evolved Serving Mobile Location Center ("E-SMLC") 390 that is connected to the core network 370 and a SUPL Positioning Center ("SPC") 395 (e.g., as described by the SUPL standards available from the Open Mobile Alliance ("OMA")) that is connected with the location center 372. In some implementations, a location estimation component 350 may be a sub-component of the E-SMLC 390.

The various access networks 340-344 are also connected to a core network component 370 that provides core network control, including switching or otherwise routing voice and/or data between location estimation components 350; access networks 340-344; a Public Switched Telephone Network ("PSTN"); a telephone switch such as a 5ESS switch, a PBX switch; a data or IP network; a router; other switches; other core network components; and/or the like. The core network component 370 may include one or more discrete network components, including, inter alia, switches, a Mobility Management Entity ("MME") (e.g., as described by the System Architecture Evolution ("SAE") standards available from the 3GPP, such as by TS 33.40) and/or similar components that provide core network control. Also, the core network component 370 may include a Mobile Switching Center ("MSC"), a media gateway, a call gateway, and/or the like. For simplicity, in FIG. 3, all the various discrete network control components are shown within a single, amalgamated core network component 370 since each discrete component provides similar or analogous functionality. One having skill in the art will also appreciate that each discrete network component may be configured to directly couple or interact with only a subset of the access networks 340-344 and/or a subset of the discrete location estimation systems represented by each location estimation component 350.

The core network component 370 is connected to a location center 372. The location center 372 is configured to send location estimation requests to, and receive location data from, access networks 340-344, the location estimation component 350, E-SMLC 390 and/or SPC 395. To do so, the location center 372 is configured to request or determine routing information (e.g., from a Home Subscriber Server). The location center 372 may additionally perform administrative functions such as authentication/security, privacy and billing. The location center 372 may additionally be coupled to an Automatic Location Identification Database ("ALI database") server and/or similar database servers that map phone numbers (or IP addresses or similar identifiers) to physical addresses or geographical locations. The location center 372 may include one or more discrete location center components, including, inter alia, a Gateway Mobile Location Center ("GMLC"), a Location Retrieval Function ("LRF") (e.g., as described by the IMS specifications and technical reports of the 3GPP, Telecoms and Internet Converged Services and Protocols for Advanced Networks ("TISPAN"), or other standards organizations), a SUPL Location Center ("SLC") (e.g., as described by the SUPL standards available from OMA), and/or similar. For simplicity, in FIG. 3, all the various discrete location center components are shown within a single, amalgamated location center 372 since each discrete component provides similar or analogous functionality. Furthermore, for simplicity, only a single connection is shown between the core network component 370 and the location center 372 However, one having skill in the art will appreciate that each discrete location center component may be configured to directly couple or interact with only a subset of the access networks 340-344, a subset of the discrete location estimation components within the amalgamated location estimation component 350, and/or discrete core network components within the core network component 370.

The core network component 370 is also connected to an IP Multimedia System (IMS) 361, which interacts with other network components to provide IP services to a mobile device. An IMS 361 may include a Proxy Call Session Control Function ("P-CSCF"), an Emergency Call Session Control Function ("E-CSCF"), and Home Subscriber Server ("HSS"), e.g., as described by the IMS specifications and technical reports of the 3GPP, TISPAN or other standards organizations, including technical reports TR 23.826, TR 23.870, and/or TR 23.167, all developed by the 3GPP.

The IMS 361 is connected to a Session Continuity and Consistency Server ("SCC") 384. Generally an SCC provides IMS-based mechanisms for enabling service continuity of multimedia sessions. The SCC may implement functionalities such as handling access network transfers, mobile device transfers, and multiple media flows. SCC 384 may be an SCC as described by the IMS specifications and technical reports of the 3GPP, TISPAN, or other standards organizations, including 3GPP Technical Specification 23.237 V9.1.0. Although current implementations of an SCC enable various aspects of session management within a single network, these implementations do not provide seamless location determinations across multiple access networks and/or mobile devices as shown in FIG. 2.

Each of the discrete components within the location center 372 (e.g., a GMLC, LRF and/or SLC) is suitable for determining and serving the location of a mobile device as determined by a single access network. However, each of these discrete components takes a piecemeal approach to location determinations and thus typically these discrete components cannot consistently provide position continuity and/or location continuity across different access networks and different mobile devices as shown in FIG. 2. In order to provide improved position continuity and/or location continuity and/or other benefits such as improved accuracy or speed, as a user changes networks and/or devices, a Location Continuity Application Server (LCAS) 376 is therefore introduced into the system. The LCAS 376 is coupled to location center 372 via the SCC 384 and IMS 361 so it may initiate multiple location estimations or determinations in multiple access networks and reconcile the results of these multiple determinations.

As will be described in additional detail herein, LCAS 376 receives location data, including positioning measurements or location estimates, from one or more components and subsystems within communications system 300 or from other communications systems. The LCAS 376 stores the received data in a location database ("DB") 386, and uses the received data in order to accurately determine a location of a mobile device using various location determination methods. The determined location is provided to emergency, commercial, and/or other location-based services. In one example, LCAS 376 is configured to provide determined location information to a PSAP, e.g., as part of an E911 service. LCAS 376 may also be configured to provide determined location information to any other entity or for any other purpose. For example, LCAS may be configured to provide determined location information to mobile device users, network operators or network components, third-party location-based service providers, remote telemetry users, advertisers, and/or the like.

Although shown as a discrete component, some or all of the functionality of the LCAS 376 may be performed by the SCC 384. Additionally or alternatively, some or all of the functionality of the LCAS may be performed in whole or in part by a mobile device 110, 112, 114 (e.g., by a location continuity stack application resident therein) and/or one or more other system components, including the location estimation component 350. To simplify system architecture, the LCAS may provide some of the functionality that is typically provided by a service broker within the IMS 361 and/or may interact with a service broker within the IMS. The LCAS 376 is described in greater detail with respect to FIG. 4.

While communications system 300 is illustrated and described in terms of 2G, 3G, 4G, IP RAN, and hard-wired network components and architecture, the system is not limited to such technologies. Any suitable communications system may employ aspects of the invention described herein. Additionally, while FIGS. 1-3 illustrate specific examples of suitable environments and communications systems in which aspects of the invention may be practiced, various modifications, such as the inclusion of additional components, consolidation and/or deletion of various components, and shifting of functionality from one component to another may be made without deviating from the invention.

Location Continuity Application Server ("LCAS")

Figure 4:
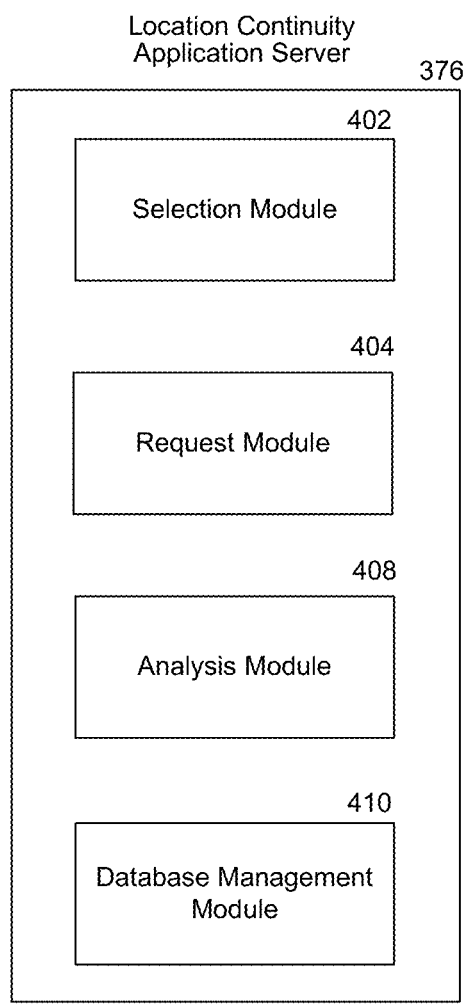
FIG. 4 is a block diagram of a location continuity application server.

FIG. 4 is a block diagram of the LCAS 376. As shown, LCAS 376 comprises a selection module 402, a request module 404, an analysis module 408, and a database management module 410.

The LCAS 376 facilitates continuous positioning measurements and location determinations in response to a request to locate a mobile device 110, 112, 114. The request that the LCAS locate a mobile device may be received at any time, regardless of whether the mobile device is powered on, powered off, in use, or sitting idle. For example, a request may be received prior to, during, and/or after a call is made on the mobile device. A request from a service for the location of a mobile device may be received only once (e.g., to provide a map for the mobile device), or may be received frequently (e.g., during an emergency event where it may be important to accurately track the movement of the mobile device at all times).

The selection module 402 receives the request for the location of the mobile device from a requesting service and selects a suitable location determination method or methods for the system to utilize in order to locate a particular mobile device in a manner that is responsive to the requesting service. The selection module 402 may analyze any relevant criteria to select a suitable location determination method or methods. Criteria used in the selection process include:

The type, make, model, or capabilities of the mobile device 110, 112, 114 being located.

The types of access networks currently or previously available to the mobile device being located and related criteria, such as a network's signal strength at the mobile device.

The quantity, quality and nature of stored historical location data for the mobile device, including historical positioning measurements, estimated locations, and reference locations.

The quality of service ("QoS") required by the requesting location-based service. For example, the QoS metrics required for an emergency service may be more stringent than for a navigation application or a location-based search application. The QoS may include both location accuracy and timeliness of location response.

The costs or resources associated with using the various determination methods.

Any other current or past session factors, such as the IMS used (e.g., a home IMS or visited IMS), core IP network used (e.g., a home core IP network versus a visited core IP network), application used, application session, and applicable charging scheme.

More details regarding the selection of one or more suitable location determination methods may be found in assignee's U.S. patent application, Ser. No. 12/467,201, filed May 15, 2009, entitled "Facility for Selecting a Mobile Device Location Determination Technique" (now U.S. Pat. No. 8,311,557 issued Nov. 13, 2012), which is incorporated herein in its entirety.

When selecting a suitable location determination method, selection module 402 is not limited to selecting only a single location determination technique implemented by a single access network. Instead, selection module 402 may identify two or more determination techniques that are implemented by different access networks and specify a process to conduct the two or more techniques and analyze the results of those two or more techniques. To indicate the appropriate method of utilizing various location determination techniques, the selection module specifies a reconciliation process that is suitable for the location request. The reconciliation process is implemented by the request module 404 and analysis module 408. A reconciliation process is generally a data structure or other information source that contains a set of rules, methods, preferences, priorities, and parameters for utilizing two or more kinds of location determination techniques that are implemented by two or more access networks. The reconciliation process may be generated from scratch based on certain criteria such as the specific conditions detected by the selection module, or may be selected from a set of stored reconciliation processes that are maintained by the selection module 402.

A reconciliation process may dictate that two or more parallel location estimation processes be initiated to guard against failures or inaccuracy of any one location estimation process. The selection module 402 might require this type of reconciliation process if the location-based service requesting location data requires a high quality of service regardless of cost. The selection module 402 might also require this type of reconciliation process for an emergency (e.g., E911) service. As an example, the LCAS initiates a primary method of location determination (e.g., AGPS or U-TDOA), and one or more backup methods of location determination (e.g., CI-RTT, hybrid RTT, and/or LTE-based methods). If the primary method of location determination fails to produce location estimates with a desired accuracy or uncertainty (or satisfy other performance metrics, such as a desired time to fix ("TTF")), the LCAS may instead utilize results from one or more backup methods.

To describe a parallel location estimation, a reconciliation process indicates which location determination methods should be initiated in which access networks and when and how these methods should be initiated. For example, a reconciliation process may configure the signaling period for a particular access network and/or mobile device 110, 112, 114. The reconciliation process provides rules and parameters for selecting between the results of a primary and backup location estimation method. For example, a reconciliation process may indicate the accuracy, TTF, and/or other performance metrics that must be achieved by a primary or backup method. As another example, a reconciliation process may provide a rank ordering of backup methods and/or provide weights or other combination factors to derive a weighted average of location estimates generated by primary methods and/or backup methods (as described in greater detail herein) or another type of combination of two or more location estimates.

A reconciliation process may also provide various rules, methods, and parameters for utilizing positioning measurements, location estimates, and/or other location data that is provided by a visited communications systems 300. Such a reconciliation process may permit the system to provide greater positioning and location continuity when a mobile device roams outside its home communications system 300.

A reconciliation process may also indicate how to utilize positioning measurements, reference locations, estimated locations and/or other location data that were generated for different mobile devices. For example, a reconciliation process may indicate how positioning measurements and/or estimated location data generated for one or more mobile devices 110, 112, 114 may be used to determine the location of another mobile device. For example, a reconciliation process may specify that if one mobile device 110 owned by a particular user cannot be located with sufficient accuracy (or with a certain TTF), that the system should utilize the determined location of another mobile device 112 owned by or otherwise associated with the same user.

As another example, a reconciliation process may indicate how positioning measurements and/or estimated locations generated for one session may be used to determine the location of a mobile device during another session. For example, a reconciliation process may specify that a location estimate generated previously by a GSM network for a navigation program on a mobile device may be provided to a location-based search running on the same mobile device. This prior location estimate may be provided to the location-based search application until an overlapping UMTS network generates a new location estimate having sufficient accuracy.

As yet another example, a "combining" reconciliation process may indicate how to combine the positioning data and/or location estimates generated from two or more determination techniques that are performed by one or more access networks. In some examples, a reconciliation process may specify a combination of "live" data that is currently being generated by two or more determination techniques. In other examples, a reconciliation process may specify a combination of "live" data from one or more determination techniques with historical data from one or more other determination techniques. A selection module might select this type of reconciliation process in order to satisfy stringent TTF, yield, cost or accuracy criteria. For example, a selection module might select this type of reconciliation process for an E911 service. For example, a reconciliation process may combine two or more location estimates generated by two or more access networks via a weighted average. As an example, if a mobile device is simultaneously accessible by both a GSM access network and a UMTS access network, a selection module may indicate via a reconciliation process that the GSM access network should perform U-TDOA location estimations and the UMTS access network should perform OTDOA location estimations. The selection module may further indicate via a reconciliation process that the system should perform a weighted average of the two location estimates, with the U-TDOA estimate weighted twice as heavily as the OTDOA estimate.

More generally, this type of second reconciliation process may utilize two or more sets of positioning measurements data and/or estimated location data generated by one or more access networks. The process may then mathematically transform the data sets to create two or more transformed data sets. Finally, the process may mathematically combine the two or more transformed sets. The transformations may be a linear transformation (including an identity transformation) or non-linear transformation. The transformations may also be invertible or non-invertible transformations. Non-exhaustive examples of transformations to data sets include:

scaling the set (by a constant);
    generating a mean value or other moment;
    raising the set to a power;
    taking a logarithm, derivative or integral of the set; and
    applying a ceiling or floor mapping to the set (i.e., quantization), and the like.

The transformations applied to a data set may also merge a number of these simple exemplary transformations. The various transformed data sets may be mathematically combined to create a location estimation. The combination may be a linear combination or a non-linear combination. Non-exclusive examples of combinations include any polynomial of the various transformed data sets, including a simple summation of the various transformed data sets.

Another type of mathematical combination is selecting a point at the intersection of two or more ranges or areas that represent two or more location estimates. For example, a first location estimate may be expressed as a circle (a first "estimation area") having a radius R1 centered at a geographical point L1, and a second location estimate may be expressed as a circle (a second estimation area) having a radius R2 centered at L2. In this example, the reconciliation process may dictate that the system determine the location to be a point on a line connecting these two radii. The reconciliation process may further dictate how to select that estimated location point (e.g., by using the relative radii of the estimation areas).

Figure 6:
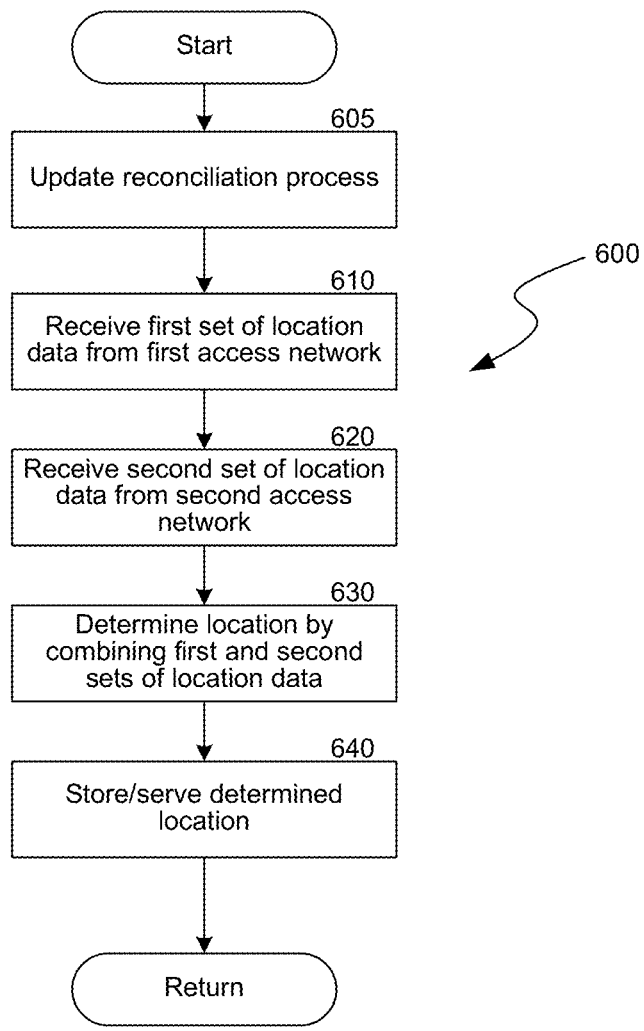
FIG. 6 is a logical flow diagram of a process for combining multiple location estimations in one or more access networks.

To implement "combining" reconciliations, a reconciliation process may indicate which location determination techniques should be initiated in which access networks and when and how these techniques should be initiated. The reconciliation process may further indicate the types of mathematical transformations and combinations that should be applied to the various positioning measurements and location estimates generated by the two or more techniques. The reconciliation process may also provide parameters necessary to implement those mathematical transformations and combinations (e.g., weights). Since various access networks may produce location estimates corresponding to different time points, the reconciliation process may also provide various rules, methods (e.g., transformations and combinations), and parameters (e.g., weights) for combining two or more location estimates that correspond to two or more different time points. FIG. 6 illustrates one suitable process for implementing this type of "combining" reconciliation process.

Yet another type of cross-network "seeding" reconciliation process utilizes reference locations, location estimates, positioning measurements, identifiers or similar information generated by one or more location determination techniques to provide one or more reference locations that "seed" or initiate one or more other location determination techniques. A selection module might select this type of reconciliation method in order to satisfy location determination performance criteria, such as TTF, yield, or accuracy criteria. As an example, if an AGPS reference location for a mobile device is available that was previously acquired from a GSM network, but later a UMTS network is available to the same mobile device, the selection module may indicate via a reconciliation process that the UMTS network should perform an AGPS location estimation that utilizes the reference location generated by the GSM network. In another example, a mobile device is utilizing a GAN access network associated with a MAC address identifier that is associated with a geographical location (e.g., the street address of the user's house). In this example, the selection module may indicate via a reconciliation process that an overlapping UMTS network should perform an AGPS location estimation that utilizes the associated geographical location as its reference location.

Figure 7:
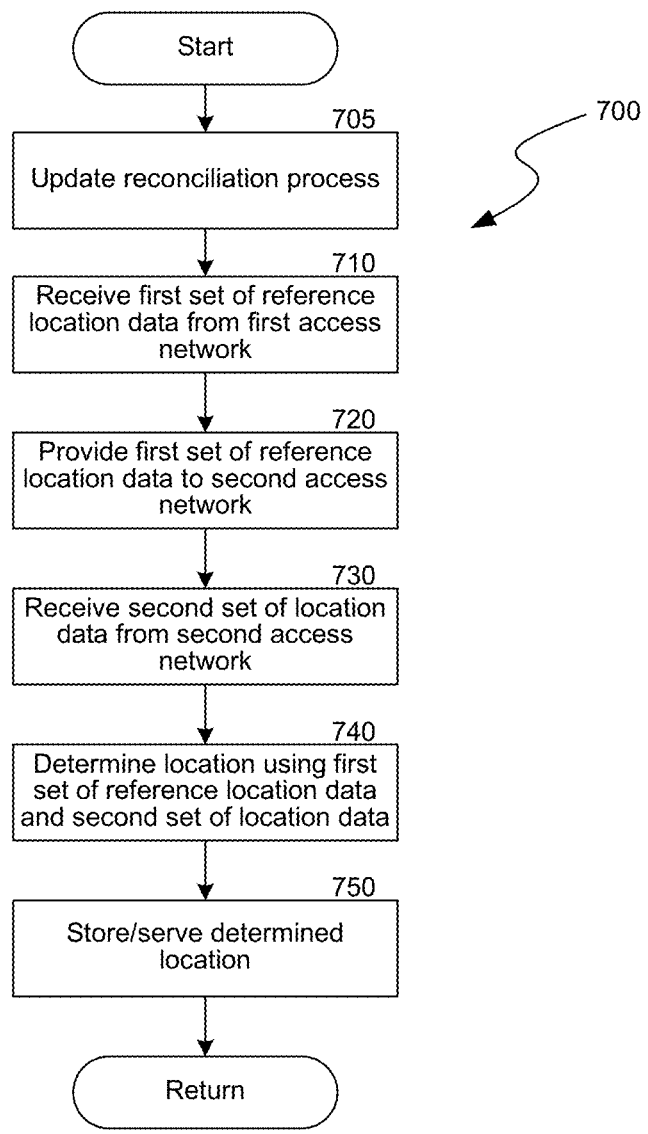
FIG. 7 is a logical flow diagram of a process for performing a location estimation in a second access network by utilizing a reference location generated by a first access network.

To implement this type of "seeding" reconciliation, a reconciliation process may indicate which location determination techniques should be initiated in which access networks and when and how these techniques should be initiated. A reconciliation process will indicate how to generate new reference location(s) from the positioning measurements, estimated locations, reference locations and identifiers generated by a first set of access networks. The reconciliation process will further indicate how to provide these reference location(s) to seed or initiate a location estimation in a second set of access networks. The set of location data corresponding to the location estimation in the second set of access networks may then be utilized in a "combining" reconciliation process with one or more other sets of location data from one or more other access networks, as described above. FIG. 7 illustrates one suitable process for implementing this type of "seeding" reconciliation process.

These examples of reconciliation processes are intended to be illustrative, not exhaustive. The selection module 402 may indicate a reconciliation process that blends elements of these examples or utilizes other suitable location determination approaches. Various examples of reconciliation processes are described in greater detail herein. Various methods of reconciling are also described in greater detail herein and in assignee's U.S. patent application, Ser. No. 12/769,524, filed Apr. 28, 2010, entitled: LOCATION CONTINUITY SERVICE FOR LOCATING MOBILE DEVICES USING MULTIPLE ACCESS NETWORKS INCLUDING WIRELESS TELECOMMUNICATION NETWORKS (now U.S. Pat. No. 8,472,974 issued Jun. 25, 2013), which is hereby incorporated herein in its entirety.

The request module 404 initiates location estimations in various access networks and/or retrieves location data such as estimated locations and positioning measurements from various access networks in accordance with a reconciliation process. To do so, the request module 404 may request that the location center 372, a mobile device 110, 112, 114, and/or another system component initiate positioning measurements and/or location determinations in one or more access networks and/or provide location data for a mobile device. In some implementations, the request module 404 may utilize the IMS 361 to relay such a request.

The analysis module 408 analyzes various location data that are received or accessed from various access networks as a result of the requests made by the request module 404, including positioning measurement data and/or estimated location data. The analysis module 408 applies the specified reconciliation process to the various data sets to generate a set of determined locations that LCAS 376 may utilize.

Database management module 410 is responsible for maintaining, updating, and providing access to positioning measurements, estimated locations, and other location data stored in location database 386. For example, the database management module maintains positioning measurement data and/or estimated location data generated by various access networks that were requested by request module 404 or received by analysis module 408. Database management module also maintains determined location data generated by analysis module 408 based on the applied reconciliation process. In response to a request for location data, the database management module 410 provides the requested positioning measurement data and/or estimated location data.

The LCAS 376 provides the determined location of the mobile device to the requesting service. The requesting service may be a PSAP or another emergency location-based service, another system component (e.g., an E-CSCF, P-CSCF or a system component that performs network registration or billing functions) within the same or a different communications system an LCAS associated with a different communications system, or any other requesting service (e.g., a navigation application, an asset tracking or recovery service, another non-emergency location-based service, etc.). The requesting service may be operated by commercial entities and/or non-commercial entities (e.g., governmental, nonprofit, or other non-commercial entities).

The location information may be provided for free, or a charge may be levied against the requesting service and/or a user of a mobile device 110, 112, 114 when the location data is provided.

The LCAS 376 may be a separate logical entity within the communications system 300 network or be functionally split between the mobile devices 110, 112, 114, and the communications system network in such a way that the final computation or location determination is performed by a mobile device and/or the network. Within the scope of the communications system network, the LCAS can be a logical component part of Radio Network Controllers (RNC), SAS, SMLC, e-SMLC, SPC, and/or Location Information Server platforms.

Alternatively or additionally, the memories of mobile devices 110, 112, 114 may store a location continuity stack application in order to improve location continuity and/or position continuity over a call session and/or other type of session. In some implementations, a location continuity stack application may perform some or all of the functionality of LCAS 376, including the functionality provided by its selection module 402, request module 404, and/or analysis module 408. For example, a location continuity stack application may be configured to permit a mobile device to simultaneously register with two or more access networks, and/or to continuously conduct positioning measurements and/or location estimations with two or more access networks. As another example, a location continuity stack application may be configured to permit a mobile device to seamlessly initiate positioning measurements and/or location estimations with a newly accessed network. As yet another example, a location continuity stack application may be configured to permit a mobile device to analyze multiple sets of location data (e.g., estimated locations) provided by various access networks.

The LCAS 376 can make use of positioning measurements from 3GPP control plane, OMA SUPL user plane, or a combination of measurements from both control and user plane location processes.

Those skilled in the art will appreciate that the LCAS 376 may be implemented on any computing system or device. Suitable computing systems or devices include personal computers, server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic- or optical-based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Location Data Storage

FIG. 5 shows a table 500 that conceptually illustrates the type of location data or information generated and stored by LCAS 376 and its components in location database 386. As used herein, the terms "location data" or "location information" include positioning measurements (e.g., range measurements of a mobile device within a network), estimated locations (e.g., an estimate of the latitude, longitude and/or altitude of a mobile device and, in some implementations, the time and/or estimated or calculated uncertainty or accuracy of the location estimate), and reference locations (e.g., an AGPS reference location previously used to locate a mobile device). As described herein, the location data in location database 386 may be utilized in location determination techniques or to otherwise improve position and/or location continuity and/or other performance metrics of a location determination (e.g., time-to-fix or accuracy).

As a first example, stored location data generated by one access network may be combined with stored location data generated by a second access network. As a second example, historical location data in location DB (or related information, such as a historical reference location) generated by a first access network may be utilized to provide a reference location for a new location determination in a second access network. As a third example, stored location data for one mobile device may be utilized to locate a second mobile device. As a fourth example, to improve location continuity, historical location data in location DB may be sent to a location-based service following the handoff from a first access network to a second access network until the second access network is able to determine the location of a mobile device. As a fifth example, to improve location continuity, data in location DB may be sent to a visited communications system when a mobile device roams into the visited network.

The location data in location database 386 may also be utilized for various commercial and non-commercial purposes, such as marketing intelligence, network registration, billing/charging, location-based advertising campaigns, remote telemetry, social networking technologies, or any other location-based service that may benefit from mining historical location data. Additional examples include asset tracking or recovery services, customer analytics, and mobile device security.

As shown in FIG. 5, the table 500 includes columns for a session identifier ("ID") 505 and a mobile device ID 510. A session ID is a globally or locally unique identifier for a particular session and a device ID is a globally or locally unique hardware identifier for a mobile device 110, 112, 114. Each row 545, 550, 555, 560 in table 500 corresponds to a unique combination of a session and device. For example, the first and second rows 545, 550 each correspond to session ID "A3F1," but the two rows have different device IDs ("LL13" and "DJ82," respectively).

Table 500 may have additional columns (not shown) that reflect other session or state factors related to a row. For example, table 500 may have additional columns that reflect the application(s), access network(s), and/or core IP network (s) used during a session. Each entry in these additional columns may reflect either a single static value, or may reflect a time series (for example, to reflect how a mobile device moved from one access network to another over time). In some implementations, each row may correspond to a different combination of session factors (and/or other factors). For example, table 500 may have a separate row for each unique combination of a session, device, and application (e.g., a navigation application versus a location-based search application).

Columns 525-540 in table 500 reflect estimated locations for each session/device pair generated by a particular type of access network using a particular type of location determination technique. For example, column 525 may include estimated locations generated by a first access network (e.g., a GSM network) using a first location determination method (e.g., U-TDOA) while column 530 may include estimated locations generated by the first access network (e.g., the same GSM network) using a second location determination method (e.g., AGPS). As another example, column 535 may include estimated locations generated by a second access network (e.g., a UMTS network) using the second location determination method (e.g., AGPS). As shown, there may be any number of additional columns 565, each of which corresponds to a unique combination of an access network and a location determination method.

As indicated in FIG. 5 with the text "[t]," each individual entry in columns 515-540 may reflect a time series of estimated locations. Each entry in these columns may have one, none, or multiple location estimates, where each location estimate is associated with a particular point in time. Furthermore, each location estimate may be expressed as a range or confidence window indicating a two- or three-dimensional geographical area (e.g., +/−5 meters) or may be associated with an estimated or calculated accuracy or uncertainty. As shown, not every combination of access network and device will contain estimated locations. A particular device may not utilize a particular access network or a particular location determination technique may not have been used to estimate the location of a device. For example, as shown by the text "NULL" at row 555, column 540, the device "A6N5" has not utilized Network 3. As another example, as shown at row 550, column 530, the device "DJ82" utilized Network 1, but as shown by the text "NULL" at row 550, column 525, Network 1 did not estimate its location using Method 1.

Additionally or alternatively, although not shown, table 500 may include columns that represent raw positioning measurement data (e.g., range measurements of a mobile device within a network, a cell identity, a base station latitude or longitude, etc.) or additional information related to the derivation of estimated locations generated by various access networks. For example, table 500 may include a column for reference locations that were generated by various access networks. As an example, the "L3[t]" entry at row 545, column 535 may represent the estimated location of a mobile device "LL13" at various time points as determined by Access Network 2 using an AGPS technique. In this example, table 500 may include an additional column (not shown) that stores the AGPS reference location(s) used to calculate L3[t]. As another example, an entry in table 500 may be associated with one or more identifiers of a cell, femtocell, picocell, access point, base station, Node-B, eNode-B, cell site, and/or other network component or network that were accessible to the mobile device, and that were utilized to estimate the location of the mobile device associated with that row. For example, table 500 may associate an entry with a time series of identifiers that reflects how a mobile device moved from one base station (BTS 340) to another within a particular access network. The table 500 may also store information associated with such identifiers (e.g., a geographical location of a particular base station).

Table 500 also includes columns for estimated locations that are generated using a reconciliation process that is applied by the LCAS. For example, column 515 contains a location that was determined by a reconciliation process H1, and column 520 contains a location that was determined by a reconciliation process H2. The table may have any number of additional columns each reflecting locations that are generated by a different reconciliation process. Entries in these columns may have been generated using the other various entries in the table (i.e., the estimated location, positioning measurement data, reference locations, or related information that is generated by various access networks). As indicated by the text "F1[[L1[t]-Ln[t]]," for example, a determination method that is used to generate data in column 515 may functionally combine or otherwise utilize location or position data that is generated for other mobile devices, other session factors, or other sessions altogether.

Combining Location Estimations from Multiple Access Networks

FIG. 6 is a logical flow diagram of a process 600 for combining location estimations generated by one or more access networks. LCAS 376, its components, or another suitable system may perform process 600 in order to provide determined locations in response to a request from an emergency or non-emergency location-based service to locate a mobile device 110. Process 600 may be performed when a mobile device 110 that is registered with a first access network subsequently or simultaneously registers with a second access network.

By combining location estimations from various access networks in process 600, the system may improve accuracy, yield, cost, and/or TTF when locating a mobile device. The process 600 may also improve location continuity following a handoff from one access network to another. For example, as described herein, process 600 may utilize historical estimated location data generated by a first access network to improve upon the initial location determinations generated by a second access network. As another example, as described herein, process 600 may combine the results of simultaneous location estimations performed by first and second access networks. As a further example, as described herein, process 600 may combine location estimations performed by three or more access networks. Additionally, one of the location estimates utilized by process 600 may have been obtained by an access network based on a reference location provided to the access network as part of process 600.

The LCAS 376 may receive notifications that a mobile device has registered with a first access network and, either simultaneously or subsequently, has registered with a second access network. Process 600 begins at block 605, when the LCAS utilizes selection module 406 to generate or update a reconciliation process applicable to the mobile device. The reconciliation process is updated or generated to reflect the currently and previously-available access networks, the availability of historical location or positioning measurement data (e.g., from the first access network), and/or other applicable criteria, as described previously. The reconciliation process indicates which location determination methods to utilize in which access networks, and when and how to initiate the location determination methods. The reconciliation process also provides rules and parameters for combining the results of the location determination methods, and/or historical positioning measurement or location estimation data generated by these methods.

In a first example, a mobile device is registered with a first access network that performs a location estimation of the mobile device. Subsequently the mobile device registers exclusively with a second access network (i.e., it is no longer registered with the first access network). In these circumstances, the reconciliation process may specify that the LCAS should initialize a location estimation in the second access network. The reconciliation process may further specify that until the second access network has produced a location estimate with a desired level of accuracy, the LCAS should combine one or more of the last historical location estimates generated by the first access network with the estimates initially generated by the second access network.

To illustrate this first example, a mobile device may be registered with a GSM access network that performs an AGPS location estimation that shows the mobile device to be at geographical location G1 at time T1. Shortly after time T1, the mobile device registers exclusively with a UMTS access network instead of the GSM access network. The applicable reconciliation process may specify that the UMTS access network should perform its own AGPS location estimation. To improve location continuity and accuracy, the reconciliation process may further specify that until the UMTS AGPS location estimation produces an estimate with an accuracy of at least 25 meters, the UMTS AGPS location estimation should be averaged with location G1. In some implementations, the reconciliation process may specify that a weighted average of G1 and the UMTS AGPS location estimations should be performed. In such implementations, the reconciliation process may give less weight to G1 as the accuracy of the UMTS AGPS estimation improves.

In a second example, a mobile device is registered with a first access network that performs a location estimation of the mobile device. Subsequently the mobile device registers concurrently with a second overlapping access network. In these circumstances, the reconciliation process may specify that the LCAS should utilize substantially simultaneous location estimations in both the first and the second access networks. The reconciliation process may further specify that the results produced by the first and second access networks should be combined via a weighted average (or combined via another method). The reconciliation process may further specify that these weights should vary over time, e.g., with less weight given to the results produced by the first access network as the accuracy of the second access network's estimation improves.

To illustrate the second example, a mobile device is registered with a GSM access network that performs an AGPS location estimation that shows the mobile device to be at geographical location G1 at time T1. Shortly after time T1, the mobile device registers concurrently with a UMTS access network. The GSM access network continues to perform positioning measurements and location estimations after the new registration. The reconciliation process may specify that the UMTS access network should perform its own AGPS location estimation. The reconciliation process may further specify that the two ongoing AGPS location estimations (one from GSM, one from UMTS) should be combined, e.g., using a weighted average that initially gives more weight to the GSM estimated location than the UMTS estimated location.

As a further illustration of the second example, a mobile device is concurrently registered with a GSM access network and a UMTS access network. The GSM access network performs an AGPS location estimation that shows the mobile device to be within 25 meters of geographical location G1 at time T1 (i.e., within a circle of radius R1=25 meters centered at point G1). The GSM access network performs an AGPS location estimation that shows the mobile device to be within 65 meters of geographical location G2 at time T1 (i.e., within a circle of radius R2=65 meters centered at point G2). The reconciliation process may specify that the determined location of the mobile device is a point located on the line connecting the two center points G1 and G2 (or another point within the intersection of the two circles). Furthermore the reconciliation process may specify how to select the point on this line. For example, the reconciliation process may specify that the point should be selected using the relative magnitude of the two radii, R1 and R2.

Although not shown, LCAS 376 may initiate one or more location estimations or determinations in one or more access networks in accordance with the reconciliation process. For example, in accordance with the first example reconciliation process described in this section, LCAS may request that the newly accessed UMTS network initiate an AGPS location estimation for the mobile device.

At block 610, LCAS 376 accesses a first set of location data and/or positioning measurement data from a first access network. Alternatively or additionally, LCAS may access a first set of historical location data, positioning measurement data and/or related information. For example, LCAS may access a first set of estimated location data stored in location DB 386 that was generated by a first access network. For example, in accordance with the first example reconciliation process described in this section, LCAS may access the last historical AGPS location estimate generated by a GSM network before the mobile device moved. As another example, in accordance with the second example reconciliation process described in this section, LCAS may receive a set of AGPS location estimates generated by a GSM access network that reflect the mobile device's location after the device concurrently registers with a UMTS access network.

At block 620, LCAS 376 accesses a second set of location data and/or positioning measurement data from a second access network. For example, in accordance with either of the example reconciliation policies described previously, LCAS may receive a set of AGPS location estimates generated by a UMTS access network that reflect the mobile device's location after the device registers with the UMTS access network. In some embodiments, prior to accessing the second set of location data, the LCAS 376 provides the second access network with the first set of location data as reference location data. The second access network then obtains the second set of location data based at least on the reference location data.

Instead of an LCAS 376 initiating, waiting for and receiving sets of location data, one or more access networks may automatically push positioning measurement or estimated location data to the LCAS without intervention by the LCAS.

The first and second data sets may include one or more estimates of the location of a mobile device at a certain time point. The various data sets may include location estimates for different time points. At blocks 610 and 620, LCAS 376 may also receive or access positioning measurement data, reference locations used (e.g., an AGPS reference location used), identifiers used, and/or state or session information that was generated by the first and second access networks.

At block 630, LCAS 376 determines the location of the mobile device by combining the first and second sets of location data that were received or accessed (and/or combining positioning measurement data received or accessed). To make this determination, the LCAS may apply rules, methods, preferences, priorities, and parameters for combining one or more kinds of location estimation techniques that are reflected in the applicable reconciliation process. For example, in accordance with the first example, LCAS may perform a weighted average of a historical location data generated by a GSM network and an estimated location generated by a UMTS network; the average may give more weight to the GSM data, at least for those time points that closely follow the mobile device's registration with the UMTS network. As another example, in accordance with the second example, LCAS may perform a weighted average of a location estimate that is newly generated by a GSM network and an estimated location generated by a UMTS network. In some embodiments, the LCAS 376 determines the location of the mobile device by combining one or more additional sets of location data with the first and second sets of location data.

At block 640, LCAS stores and/or serves the determined location at one or more time points. LCAS may also invoke database management module 410 to store the determined location. For example, database management module 410 may store one or more determined locations in column 515.

Although not shown, the LCAS may store some or all of the estimated location data received from the various access networks in location DB 386 and may also store the additional information received from the one or more access networks therein. To illustrate, the LCAS may add AGPS location estimates received from a GSM network to column 530, and add AGPS location estimates received from a UMTS network to column 535 of table 500.

Utilizing a Reference Location Generated by Another Access Network

FIG. 7 is a logical flow diagram of a process 700 for performing a location estimation in a second access network by utilizing a reference location generated by a first access network. LCAS 376, its components, or another suitable system may perform process 700 in order to provide determined locations in response to a request from an emergency or non-emergency location-based service to locate a mobile device 110. Process 700 may be performed when a mobile device registered with a first access network subsequently or simultaneously registers with a second access network. By utilizing a reference location generated by a first access network, the system may improve accuracy, yield, cost, and/or TTF when locating a mobile device using a second access network.

When the mobile device registers with a second access network, the LCAS 376 may receive a notification of that new registration. Such a notification may trigger the start of process 700 at block 705, where LCAS utilizes selection module 406 to generate or update a reconciliation process applicable to the mobile device to reflect currently and previously available access networks, the availability of historical location or positioning measurement data or reference locations, and/or other applicable criteria, as described previously. The reconciliation process indicates which location determination techniques should be initiated in which access networks, and when and how the location determination techniques should be initiated. The reconciliation process further indicates how to generate a new reference location or reference locations from the positioning measurements, estimated locations, reference locations and identifiers generated by the first access network. The reconciliation process will further indicate how to provide these reference location(s) in order to seed or initiate location estimation in a second set of access networks. For example, a reconciliation process may indicate that an AGPS reference location generated by one access network should be utilized as a reference location for an AGPS estimation in a second access network. As a second example, a reconciliation process may indicate that the most recent location of a mobile device 110 (as determined by a first access network) should be utilized as a reference location for an AGPS estimation in a second access network. As a third example, a reconciliation process may indicate that a location associated with an identifier (such as a MAC address) within a GAN access network should be utilized as a reference location for an AGPS estimation in a second access network. As a fourth example, a reconciliation process may specify how a reference location generated by a first access network should be utilized as the initial estimated location in a second access network.

To illustrate, a mobile device may be registered with a GSM access network that performs an AGPS location estimation by utilizing an AGPS reference location, such as a reference location associated with an SMLC/SAS 350 within the GSM access network. Very shortly after time T1, the mobile device registers with a UMTS access network. The mobile device may or may not remain registered with the GSM access network. The reconciliation process generated may specify that the UMTS access network should perform its own AGPS location estimation. The reconciliation process may further specify that during its AGPS location estimation, the UMTS access network should utilize as its reference location, the most recent reference location generated by the GSM access network (e.g., a reference location associated with an SMLC/SAS 350). As another example, the reconciliation process may further specify that during its AGPS location estimation, the UMTS access network should utilize as its reference location, the most recent estimated location of the mobile device that was generated by the GSM access network.

At block 710, LCAS 376 receives a first set of location data, reference locations, and/or positioning measurement data from a first access network ("a first set of reference location data"). Alternatively or additionally, LCAS may access a first set of historical location data, reference locations, or positioning measurement data and/or related information. For example, LCAS may access a first set of estimated location data stored in location DB 386 that was generated by a first access network, such as the last historical AGPS location estimate generated by a GSM network before the mobile device moved exclusively to a UMTS network. As another example, the LCAS may receive a set of AGPS location estimates generated by a GSM access network that reflect the mobile device's location after the device concurrently registered with a UMTS access network. As yet another example, the LCAS may receive an AGPS reference location generated by the GSM access network (e.g., a reference location associated with an SMLC/SAS 350).

At block 720, LCAS 376 provides some or all of the first set of reference location data to a second access network so it may initiate one or more location estimations or determinations in accordance with the reconciliation process. The LCAS may also provide an indication to the second access network how it should utilize this data as a reference location and/or initial estimated location. For example, in accordance with the first example reconciliation processes described in this section, LCAS may request that the newly accessed UMTS network initiate an AGPS location estimation for the mobile device; the LCAS may further request that the UMTS network utilize as a reference location either (1) a reference location that is associated with an SMLC/SAS within a GSM access network, or (2) an estimated location of the mobile device that was generated by the GSM access network. In some embodiments, the LCAS 376 may also provide one or more other sets of reference location data to the second access network to be used in conjunction with or in place of the first set of reference location data.

At block 730, LCAS 376 receives a second set of location data and/or positioning measurement data from a second access network. For example, in accordance with a reconciliation policy, the LCAS may receive a set of AGPS location estimates generated by a UMTS access network that reflect the mobile device's location after the device concurrently registers with the UMTS access network.

Instead of an LCAS 376 initiating, waiting for, and receiving sets of location data, one or more access networks may automatically push positioning measurement or estimated location data to the LCAS without intervention by the LCAS.

The first and second data sets may include one or more estimates of the location of a mobile device at a certain time point. The various data sets may include location estimates for different time points. At blocks 720 and 730, LCAS 376 may also receive or access positioning measurement data, reference locations used (e.g., an AGPS reference location used), identifiers used, and/or state or session information that was generated by the first and second access networks.

At block 740, LCAS 376 determines the location of the mobile device by utilizing (e.g., combining) the first and/or second sets of location data that were received or accessed (and/or combining positioning measurement data received or accessed). To make this determination, the LCAS may apply rules, methods, preferences, priorities, and parameters for combining one or more kinds of location estimation techniques that are reflected in the applicable reconciliation process. For example, in accordance with the first example, LCAS may perform a weighted average of a historical location data generated by a GSM network and an estimated location generated by a UMTS network; the average may give more weight to the GSM data, at least for those time points that closely follow the mobile device's registration with the UMTS network. As another example, in accordance with the second example, LCAS may perform a weighted average of a location estimate that is newly generated by a GSM network and an estimated location generated by a UMTS network.

At block 740, LCAS stores and/or serves the determined location at one or more time points. LCAS may invoke database management module 410 to store the determined location. For example, database management module 410 may store one or more determined locations in column 515.

Although not shown the LCAS may store some or all of the estimated location data, positioning data, reference locations, and/or other information received from the various access networks in location DB 386 and may also store the additional information received from the one or more access networks therein. To illustrate, LCAS may add AGPS location estimates received from a GSM network to column 530, and add AGPS location estimates received from a UMTS network to column 535 of table 500.

CONCLUSION

Unless the context clearly requires otherwise, throughout the description and the claims, the words "comprise," "having," "include," and the like, and conjugates thereof, are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description that are singular or plural may also be deemed to include plural or singular forms, respectively. The word "or," in reference to a list of two or more items, covers all of the following interpretations of the word: any of the items in the list, all of the items in the list, and any combination of the items in the list. The terms "based on," "according to," and the like are not exclusive and are equivalent to the term "based, at least in part, on," "at least according to," or the like and include being based on, or in accordance with, additional factors, whether or not the additional factors are described herein.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative subcombinations. Each of these processes or steps may be implemented in a variety of different ways. Also, while processes or steps are at times shown as being performed in series, these processes or steps may instead be performed in parallel, or may be performed at different times.

Any patents and applications and other references noted above, including any that may be listed in accompanying filing papers, are incorporated herein by reference. While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

We claim:

1. A computer-implemented method comprising:
   accessing from a first access network a first set of location data associated with a first position measurement for a mobile device, wherein the accessing includes specifying the location determination technique used by the first access network to generate the first set of location data;
   accessing from a second access network a second set of location data associated with a second position measurement for the mobile device; and
   combining the first set of location data with the second set of location data to determine a location of the mobile device,
   wherein the first set of location data defines a first geographic area and the second set of location data defines a second geographic area and the location is determined to be on a line connecting centers of the first and second geographic areas in an overlapping portion of the first and second geographic areas.

2. The method of claim 1, wherein the first set of location data is historical location data accessed from the first access network prior to the accessing of the second set of location data.

3. The method of claim 1, further comprising performing the accessing of the first and second sets of location data while the mobile device is concurrently registered with the first and second access networks.

4. The method of claim 1, further comprising specifying a location determination technique used to generate the second set of location data.

5. The method of claim 1, further comprising, prior to combining the first and second sets of location data, transforming at least one of the first and second sets of location data.

6. The method of claim 5, wherein the transformation is one of a linear transformation, a non-linear transformation, an invertible transformation, a non-invertible transformation, a scaling transformation, generating a mean value or moment, raising the transformed set of location data to a power, taking a logarithm, derivative, or integral of the transformed set of location data, or applying a ceiling or floor mapping to the transformed set of location data.

7. The method of claim 1, wherein the combining comprises applying a weighting factor to at least one of the first and second sets of location data.

8. The method of claim 1, wherein the combining includes performing a linear combination, a non-linear combination, or a polynomial of the first and second sets of location data.

9. The method of claim 1, further comprising:
accessing from one or more additional access networks one or more additional sets of location data associated with one or more additional position measurements for the mobile device; and
combining the one or more additional sets of location data with the first and second sets of location data to determine the location of the mobile device.

10. The method of claim 1, further comprising:
performing the accessing of the first set of location data, the accessing of the second set of location data, and the combining responsive to a location request from an emergency service provider; and
providing the determined location to the emergency service provider.

11. A location continuity application server comprising:
one or more processors; and
a plurality of modules configured to be executed by the processors to perform operations including:
receiving a request for a location of a mobile device from an emergency service provider;
responsive to the request,
accessing from a first access network a first set of location data associated with a first position measurement for the mobile device;
accessing from a second access network a second set of location data associated with a second position measurement for the mobile device; and
combining the first set of location data with the second set of location data to determine the location of the mobile device; and
providing the determined location to the emergency service provider,
wherein the first set of location data defines a first geographic area and the second set of location data defines a second geographic area and the location is determined to be on a line connecting centers of the first and second geographic areas in an overlapping portion of the first and second geographic areas.

12. The location continuity application server of claim 11, wherein the operations further include providing the first set of location data as reference location data to the second access network prior to accessing the second set of location data.

13. One or more non-transitory computer-readable storage media having computer-executable instructions stored thereon and configured to program a computing device to perform operations comprising:
accessing from a first access network a first set of location data associated with a first position measurement for a mobile device;
accessing from a second access network a second set of location data associated with a second position measurement for the mobile device; and
combining the first set of location data with the second set of location data to determine a location of the mobile device,
wherein the first set of location data defines a first geographic area and the second set of location data defines a second geographic area and the location is determined to be on a line connecting centers of the first and second geographic areas in an overlapping portion of the first and second geographic areas.

14. The one or more non-transitory computer-readable storage media of claim 13, wherein the first set of location data is historical location data accessed from the first access network prior to the accessing of the second set of location data.

15. The one or more non-transitory computer-readable storage media of claim 13, wherein the operations further comprise performing the accessing of the first and second sets of location data while the mobile device is concurrently registered with the first and second access networks.

16. The one or more non-transitory computer-readable storage media of claim 13, wherein the operations further comprise specifying location determination techniques used to generate at least one of the first and second sets of location data.

17. The one or more non-transitory computer-readable storage media of claim 13, wherein the combining includes performing a linear combination, a non-linear combination, or a polynomial of the first and second sets of location data.

18. The one or more non-transitory computer-readable storage media of claim 13, wherein the operations further comprise:
accessing from one or more additional access networks one or more additional sets of location data associated with one or more additional position measurements for the mobile device; and
combining the one or more additional sets of location data with the first and second sets of location data to determine the location of the mobile device.

* * * * *